(12) United States Patent
Damnjanovic et al.

(10) Patent No.: US 10,849,125 B2
(45) Date of Patent: Nov. 24, 2020

(54) JOINT CONTROL FOR ENHANCED CARRIER AGGREGATION

(71) Applicant: QUALCOMM Incorporated, San Diego, CA (US)

(72) Inventors: Jelena Damnjanovic, Del Mar, CA (US); Peter Gaal, San Diego, CA (US); Aleksandar Damnjanovic, Del Mar, CA (US); Wanshi Chen, San Diego, CA (US); Madhavan Srinivasan Vajapeyam, San Diego, CA (US); Jing Sun, San Diego, CA (US); Tao Luo, San Diego, CA (US); Taesang Yoo, Riverside, CA (US); Hao Xu, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 15/009,113

(22) Filed: Jan. 28, 2016

(65) Prior Publication Data
US 2016/0227541 A1 Aug. 4, 2016

Related U.S. Application Data

(60) Provisional application No. 62/157,424, filed on May 5, 2015, provisional application No. 62/145,963, filed
(Continued)

(51) Int. Cl.
*H04W 72/04* (2009.01)
*H04L 5/00* (2006.01)

(52) U.S. Cl.
CPC ......... *H04W 72/0453* (2013.01); *H04L 5/001* (2013.01); *H04L 5/0091* (2013.01); *H04W 72/042* (2013.01)

(58) Field of Classification Search
CPC .............. H04W 72/0453; H04W 72/042; H04L 5/001; H04L 5/0091
See application file for complete search history.

(56) References Cited

U.S. PATENT DOCUMENTS

| 8,687,652 B2 | 4/2014 | Zhang et al. |
| 2005/0238083 A1 | 10/2005 | Laroia et al. |

(Continued)

FOREIGN PATENT DOCUMENTS

| CN | 102742331 A | 10/2012 |
| WO | WO-2009120888 A2 | 10/2009 |

OTHER PUBLICATIONS

ISA/EPO, International Search Report and Written Opinion of the International Searching Authority, Int'l Appl. No. PCT/US2016/015630, dated Apr. 6, 2016, European Patent Office, Rijswijk, NL, 11 pgs.
(Continued)

*Primary Examiner* — Brian P Cox
(74) *Attorney, Agent, or Firm* — Holland & Hart LLP

(57) ABSTRACT

Methods, systems, and devices for wireless communication are described. Wireless devices may use enhanced carrier aggregation (eCA) to increase the throughput of a communications link, and control schemes for reducing signaling overhead may be employed to support eCA operation. For instance, downlink control information (DCI) supporting resource grants on a plurality of component carriers (CC) may be provided. These joint grants of resources may be used in addition to individual resource grants. A resource allocation granularity associated with the joint grant of resources may be based on the number of CCs scheduled by a resource grant message. The resource allocation granularity may be a function of whether uplink or downlink CCs are scheduled, and it may be determined based on a location of or channel associated with the resource grant message. A
(Continued)

receiving device may identify allocated resources based on the scheduled CCs and resource allocation granularity.

30 Claims, 21 Drawing Sheets

Related U.S. Application Data on Apr. 10, 2015, provisional application No. 62/110,252, filed on Jan. 30, 2015.

(56) References Cited

U.S. PATENT DOCUMENTS

| | | | | |
|---|---|---|---|---|
| 2010/0254329 | A1* | 10/2010 | Pan | H04L 5/001 370/329 |
| 2011/0092242 | A1* | 4/2011 | Parkvall | H04L 5/0094 455/509 |
| 2012/0039280 | A1* | 2/2012 | Chen | H04L 1/1861 370/329 |
| 2012/0051306 | A1* | 3/2012 | Chung | H04L 1/1893 370/329 |
| 2013/0028231 | A1 | 1/2013 | Zhang et al. | |
| 2013/0051259 | A1* | 2/2013 | Kim | H04L 5/001 370/252 |
| 2013/0242947 | A1* | 9/2013 | Chen | H04W 72/04 370/335 |
| 2014/0086184 | A1 | 3/2014 | Guan et al. | |
| 2014/0161085 | A1* | 6/2014 | Kim | H04W 72/042 370/329 |
| 2017/0013565 | A1* | 1/2017 | Pelletier | H04W 52/146 |
| 2017/0318565 | A1* | 11/2017 | Golitschek Edler Von Elbwart | H04W 72/042 |

OTHER PUBLICATIONS

Motorola, "PDCCH Signalling for Carrier Aggregation," 3GPP TSG RAN WG1 Meeting #56, R1-091943, San Francisco, USA, May 4-8, 2009, 10 pgs., XP_50339419A, 3rd Generation Partnership Project.

Texas Instruments, "PDCCH Carrier Indication Field for Cross-Carrier Scheduling," 3GPP TSG RAN WG1 #59, R1-094761, Jeju, Korea, Nov. 9-13, 2009, 4 pgs., XP_50389158A, 3rd Generation Partnership Project.

ZTE, "Primary and Secondary PDCCH Design for LTE-A," 3GPP TSG-RAN WG1 Meeting #57, R1-092227, San Francisco, USA, May 4-8, 2009, 12 pgs., XP_50339649A, 3rd Generation Partnership Project.

Ericsson: "Considerations on Multi-cc Scheduling," R1-153074, 3GPP TSG RAN WG1 Meeting #81, Fukuoka, Japan, May 25-29, 2015, Retrieved from the Internet< url:< a=""href="https://www.3gpp.org/ftp/tsg_ran/WG1_RL1/TSGR1_81/Docs/"">https://www.3gpp.org/ftp/tsg_ran/WG1_RL1/TSGR1_81/Docs/ 2 Pages.</url:>.

Huawei et al., "Enhancements to DL Control Signalling for up to 32 Component Carriers", 3GPP Draft; R1-151867, 3rd Generation Partnership Project (3GPP), Mobile Competence Centre, 650, Route Des Lucioles, F-06921, Sophia-Antipolis Cedex, France, vol. RAN WG1, No. Belgrade, Serbia; Apr. 19, 2015, XP050934725, Retrieved from the Internet: URL: http://www.3gpp.org/ftp/Meetings_3GPP_SYNC/RAN1/Docs/ [retrieved on Apr. 19, 2015], 4 pages.

\* cited by examiner

JOINT CONTROL FOR ENHANCED CARRIER AGGREGATION

CROSS REFERENCES

The present Application for Patent claims priority to U.S. Provisional Patent Application No. 62/157,424 by Damnjanovic et al., entitled "Joint Control for Enhanced Carrier Aggregation," filed May 5, 2015, U.S. Provisional Patent Application No. 62/145,963 by Sun et al., entitled "Using Control PDSCH for ECA," filed Apr. 10, 2015, and U.S. Provisional Patent Application No. 62/110,252 by Damnjanovic et al., entitled "Joint Control for Enhanced Carrier Aggregation," filed Jan. 30, 2015, assigned to the assignee hereof, and expressly incorporated by reference herein.

BACKGROUND

The following relates generally to wireless communication, and more specifically to joint control in enhanced carrier aggregation (eCA) configurations.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

A communication system may employ carrier aggregation (CA) to efficiently utilize available bandwidth and to increase throughput. The system may use additional control information to support the multiple component carriers (CCs) of a CA configuration. As the number of CCs scheduled for a wireless device increases, the associated control information may also increase, and providing resource grants for numerous individual CCs may result in excessive overhead.

SUMMARY

Systems, methods, and apparatuses for joint control in enhanced carrier aggregation (eCA) configurations are described. Wireless devices may use eCA to increase the throughput of a communications link. Various control schemes for reducing control overhead may be employed to support eCA operation. In some cases, the downlink control information (DCI) length may be pre-determined based on the number of configured CCs. The DCI may include a scheduling bitmap, scheduling information (e.g., HARQ info, MCS, etc.), and resource block (RB) assignment information. The scheduling bitmap may be used to identify scheduled CCs or CC groups. The scheduling information may also correspond to individual CCs, or it may be common to each CC in a CC group. RB assignment granularity may be based on the number of scheduled CCs or the bandwidth of the scheduled CCs. That is, a large number of scheduled CCs may leave a small number of bits for RB assignment. The available bandwidth may be partitioned according to the RB assignment granularity based on the number of bits available in DCI. A receiving device may identify allocated resources based on the scheduling bitmap and the RB granularity.

A method of wireless communication is described. The method may include receiving a resource grant message for a plurality of configured CCs comprising an indication of scheduled CCs from the plurality of configured CCs for a subframe, wherein a resource allocation granularity associated with the resource grant message is based at least in part on a number of the scheduled CCs and communicating on the scheduled CCs during the subframe in accordance with the resource grant message.

An apparatus for wireless communication is described. The apparatus may include means for receiving a resource grant message for a plurality of configured CCs comprising an indication of scheduled CCs from the plurality of configured CCs for a subframe, wherein a resource allocation granularity associated with the resource grant message is based at least in part on a number of the scheduled CCs and means for communicating on the scheduled CCs during the subframe in accordance with the resource grant message.

A further apparatus is described. The apparatus may include a processor, memory in electronic communication with the processor, and instructions stored in the memory. The instructions may be operable to cause the processor to receive a resource grant message for a plurality of configured CCs comprising an indication of scheduled CCs from the plurality of configured CCs for a subframe, wherein a resource allocation granularity associated with the resource grant message is based at least in part on a number of the scheduled CCs and communicate on the scheduled CCs during the subframe in accordance with the resource grant message.

A non-transitory computer readable medium for wireless communication is described. The non-transitory computer-readable medium may include instructions to cause a processor to receive a resource grant message for a set of configured CCs comprising an indication of scheduled CCs from the set of configured CCs for a subframe, where a resource allocation granularity associated with the resource grant message is based on a number of the scheduled CCs and communicate on the scheduled CCs during the subframe in accordance with the resource grant message.

In some examples of the method, apparatus, or non-transitory computer-readable medium described above, the resource allocation granularity associated with the resource grant message is based on whether the scheduled CCs comprise uplink CCs or downlink CCs. In some examples of the method, apparatus, or non-transitory computer-readable medium described above, the resource grant message is received in a control region of a downlink CC or the resource grant message is received in a data region of a downlink CC. In some examples of the method, apparatus, or non-transitory computer-readable medium described above, the resource grant message is received in a downlink control channel or the resource grant message is received in a downlink shared channel.

Some examples of the method, apparatus, or non-transitory computer-readable medium described above may further include processes, features, means, or instructions for determining the resource allocation granularity associated with the resource grant message based on whether the resource grant message comprises a message in a control region or a data region of a downlink CC.

In some examples of the method, apparatus, or non-transitory computer-readable medium described above, the resource grant message comprises one or more sets of scheduling information, where each set of scheduling information comprises at least one of a modulation and coding scheme (MCS) indication, a hybrid automatic repeat request (HARQ) indication, an new data indicator (NDI), a redundancy version (RV) indication, a transmit power control (TPC) command, a precoding indication, or a data assignment index (DAI) indication, or any combination thereof.

In some examples of the method, apparatus, or non-transitory computer-readable medium described above, the one or more sets of scheduling information comprises first scheduling information for at least one of the scheduled CCs and second scheduling information for at least two of the scheduled CCs.

Some examples of the method, apparatus, or non-transitory computer-readable medium described above may further include processes, features, means, or instructions for determining the resource allocation granularity associated with the resource grant message based on a number of resource allocation bits in the resource grant message or the number of the scheduled CCs.

Some examples of the method, apparatus, or non-transitory computer-readable medium described above may further include processes, features, means, or instructions for receiving a group configuration message partitioning the set of configured CCs into one or more groups of CCs, where each of the one or more groups of CCs comprise at least two configured CCs. Some examples of the method, apparatus, or non-transitory computer-readable medium described above may further include processes, features, means, or instructions for receiving a set of resource grant messages, where each resource grant message of the set of resource grant messages corresponds to a group of CCs in the one or more groups of CCs.

In some examples of the method, apparatus, or non-transitory computer-readable medium described above at least one group of CCs comprises downlink CCs and each downlink CC of the at least one group of CCs is associated with a same uplink control channel. In some examples of the method, apparatus, or non-transitory computer-readable medium described above, the set of configured CCs are partitioned into one or more groups of CCs based on whether the scheduled CCs comprise uplink CCs or downlink CCs. Some examples of the method, apparatus, or non-transitory computer-readable medium described above may further include processes, features, means, or instructions for receiving an additional resource grant message for an additional single configured CC.

Some examples of the method, apparatus, or non-transitory computer-readable medium described above may further include processes, features, means, or instructions for transmitting a common HARQ feedback message for the scheduled CCs.

In some examples of the method, apparatus, or non-transitory computer-readable medium described above, a size of the resource grant message is based on a number of the set of configured CCs. In some examples of the method, apparatus, or non-transitory computer-readable medium described above, the size of the resource grant message comprises a semi-static downlink control information (DCI) length.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
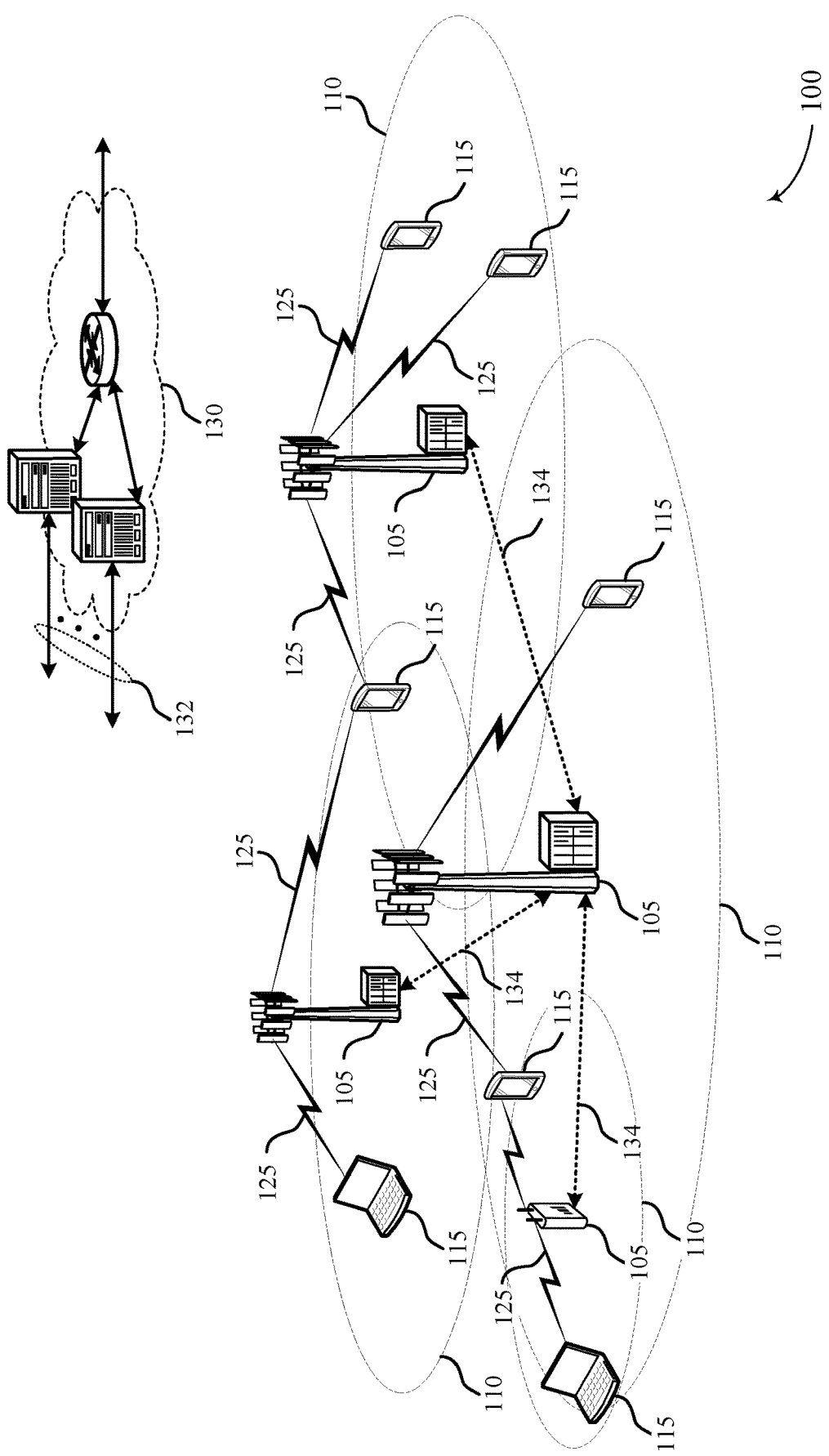
FIG. 1 illustrates an example of a wireless communications system that supports joint control for eCA in accordance with various aspects of the present disclosure.

Enhanced carrier aggregation (eCA) may be utilized to increase the throughput of a communications link. As the number of aggregated component carriers (CCs) increases, however, so may the associated control or signaling overhead. Therefore, control schemes that reduce control or signaling overhead may be employed to more readily or efficiently support eCA operation. In some examples, a wireless device may utilize a joint grant that may include downlink control information (DCI). The DCI may include control information for all of the configured CCs for the device. The control overhead for a joint grant may be further reduced by grouping the configured CCs. In other examples, a wireless device may utilize an individual grant, which may include DCI associated with multiple CCs. In yet other examples, the joint grant or the individual grant per CC may be combined with an individual grant associated with a single CC. In various examples, the number of bits available in a DCI message after including CC scheduling information may determine an allocation granularity for RB allocation within each component carrier.

In some cases, carrier aggregation (CA) configurations may support up to five component carriers. In other cases, CA may extend to more than five component carriers (e.g., 32 CCs) in an eCA configuration. This may allow a system operator to more efficiently utilize the available spectrum and increase throughput to eCA-capable devices. As mentioned, when additional CCs are utilized, the control information used to support these CCs may become unwieldy and result in excessive overhead for a particular device.

For instance, control schemes that are sufficient for CA with five CCs may not be scalable as additional CCs are added; and such schemes may be particularly unwieldy as a number CCs approach or exceed 30 CCs. Additionally, a UE may perform blind detection to detect and decode the control information for each CC and, with many CCs, such a process may be time or power consuming. Therefore, efficient use of a control channel may provide a control scheme to support many CCs. This control scheme may include a single physical control channel (e.g., the physical uplink control channel (PUCCH)), which may be on the primary cell of a CA configuration, or may be transmitted using control channels of both the primary cell and a secondary cell of a CA configuration. In another scheme, a two-stage resource assignment process may be used. A first message in a control channel may direct the UE to control information contained in a second transmission sent over a data, or shared, channel.

In some examples, a joint grant may be employed to efficiently use resources and to reduce control overhead, reduce the number of blind decodes for a device, or reduce false alarm probability. A joint grant may also allow for cross-carrier scheduling and may be used for resource assignment on CCs operating in the unlicensed and licensed spectrum. A joint grant may include a semi-statically configured DCI length that may be determined based on a CC configuration of the UE. A scheduling bitmap within the DCI may be employed to indicate which CCs of the configured CCs are scheduled—e.g., the number of bits in the bitmap may be equal to the number of configured CCs. The DCI may also include an indication of content interpretation or scheduling information, or both, for the scheduled CCs. The number of bits associated with the content interpretation may depend on the number of configured CCs that are scheduled. For instance, information related to hybrid automatic repeat request (HARQ), modulation and coding scheme (MCS), new data indicator (new data indicator (NDI)), redundancy version (RV), downlink assignment index (DAI), transmit power control (TPC), or precoding may be provided for each scheduled CCs. The available bits not used for scheduling and content interpretation purposes may be used to increase RB assignment granularity.

In some cases, the RB assignment granularity may depend on the number of scheduled CCs. As the number of scheduled CCs increases, the aggregate amount of control information for the scheduled CCs may also increase such that the interpretation of the resource allocation information may vary. For example, for a relatively small number of scheduled CCs, a finer granularity of resource allocation may be available. Similarly, as the number of scheduled CCs increases, a coarser allocation may be provided for a configured DCI format size. In some cases, however, a perceived detriment from the loss in granularity may be offset by benefit of an increased ability to schedule additional CCs within the same DCI length.

By way of example, if all configured CCs are scheduled, additional bits may be unavailable for use in RB assignment. This may be an example of a coarse allocation in which an entire CC may either be scheduled or not scheduled. As the number of scheduled CCs decreases, the number of bits available to RB assignment increases. This may increase the granularity of the RB assignment. In some cases, overhead may be further reduced using other overhead reduction techniques, such as ΔMCS indication—e.g., conveying a delta value based on a reference MCS instead of specifying the entire MCS configuration for each CC.

In another case, the overhead may be further reduced by providing coarser granularity across all grant components. For instance, the scheduling information may be provided based on CC groups. The groups may be configured by the radio resource control (RRC), which may specify the number of groups and a CC's association with a group. The number of CCs within a group may be limited (e.g., to 4 groups of 8 CCs).

Various formats may be used to generate a joint control message. In some examples, the joint control message may include one scheduling bit per CC as well as resource block allocation per CC. The RB allocation or assignment granularity may be dependent on the number of scheduled CC groups. Each CC group may, however, utilize common scheduling information, such as MCS, HARQ. The scheduling information for each group may be provided if at least one CC from the CC group has been selected. In other examples, the RB allocation may be per set of scheduled CCs within each CC group. The RBs of scheduled CCs within the CC may be considered jointly (e.g., consecutively ordered based on serving cell ID).

In some examples, a reduction in overhead may be achieved by representing a group of CCs with each bit of the scheduling a bitmap. The resource allocation may also be scheduled per CC group, where the granularity may, for example, depends on the number of available bits, which, in turn, may depend on the number of scheduled CC groups. The RB allocation may be considered jointly across the individual CCs and may be based on the serving cell ID. For instance, the RB numbering may be done base on an ascending order of serving cell IDs.

In other examples, a wireless device may utilize a grant for a specific CC group to efficiently use resources and reduce control overhead. For example, RRC signaling may define the CC groups and individual grants may be utilized per each CC group. An individual grant may thus include scheduling information for an indicated group and the scheduling information may be common for all CCs in the group. Additionally or alternatively, the resource assignment may be based on the composite bandwidth of all CCs in the group. For instance, the resource granularity may be per RB. In some cases, the RB granularity may scale with the bandwidth assignment. For example, a granularity of N RBs may be utilized for 20 MHz and a granularity of 3N may be used for 60 MHz.

In some cases, a wireless device may utilize both joint and individual grants to efficiently use resources and to accommodate finer granularity. This may be used in high traffic cases or cases in which a small number of secondary cells are available. In some cases, the joint grant may be used in cases where scheduling granularity may be coarse and the individual grant may be used to provide finer granularity. For instance, the number of cells that can be individually granted resources may be limited (e.g., 5 or 8 CCs). A UE may receive joint and individual grants in a transmit time interval (TTI) for the same or different cells. If an individual grant has been transmitted for a cell, that cell may be omitted from a joint grant occurring in the same TTI, for example. This may allow increased efficiency in the case where a small number of cells are scheduled to a UE and may allow a wireless device to avoid using the larger joint grant and more efficiently use resources.

In some cases, the number of scheduled CCs may be much smaller than the number of configured CCs, and the number of bits leftover and available for RB assignment may provide higher than 1 RB granularity. In this case, two different DCI sizes may be used for blind decoding. For example, one smaller DCI option may be used when the ratio of scheduled CCs to configured CCs is below a threshold. In other cases, the number of CCs that may be scheduled in a single DCI may be limited. A grant may thus include separate DCI per group of CCs. A UE may decode each DCI carrying assignments for different CC groups in a TTI. A two-stage grant may also be utilized in some cases: the first stage may include the scheduling bitmap and other control information, such as TPC, and the second stage may include additional control content associated with the number of scheduled CCs. The size of the second grant may change from TTI to TTI and the UE may determine the size based on the first grant.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The wireless communications system 100 includes base stations 105, UEs 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The coverage area 110 for a base station 105 may be divided into sectors making up only a portion of the coverage area (not shown). The wireless communications system 100 may include base stations 105 of different types (e.g., macro or small cell base stations). There may be overlapping coverage areas 110 for different technologies. Some of the base stations 105 may support eCA.

In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like. Some of the UEs 115 may support eCA.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). In some examples, communication links 125 include CCs configured for eCA. Communication links 125 may thus include 1, 2, 3, 4, or 5 configured carriers, or may include many configured CCs (e.g., from 6-32). At a given time, a subset of the CCs configured for a particular UE 115 may be scheduled for transmissions via communication link 125.

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a CC, a layer, a channel, etc. The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc.

A UE 115 may communicate with a single base station 105 utilizing multiple carriers, and may also communicate with multiple base stations simultaneously on different carriers. Each cell of a base station 105 may include an UL component carrier (CC) and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., acknowledgement (ACK)/negative ACK (NACK), channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

Physical downlink control channel (PDCCH) carries downlink control information (DCI) in control channel elements (CCEs), which may consist of nine logically contiguous resource element groups (REGs), where each REG contains 4 resource elements (REs). DCI includes information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI may include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a cell radio network temporary identity (C-RNTI) and cyclic redundancy check (CRC) bits attached to each DCI may be scrambled based on the C-RNTI. To reduce power consumption and overhead at the user equipment, a limited set of CCE locations can be specified for DCI associated with a specific UE 115.

CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures, and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt to descramble all potential DCI messages using its C-RNTI, and perform a CRC check to determine whether the attempt was successful. As DCI message size increases, so may the number of blind decode attempts a UE 115 may perform. Each blind decode process may cause UEs 115 to expend potentially scarce resources, including battery power, time, or the like.

A frame structure may also be used to organize physical resources with the wireless communications system 100. A frame may be a 10 ms interval that may be further divided into 10 equally sized sub-frames. Each sub-frame may include two consecutive time slots. Each slot may include 6 or 7 OFDMA symbol periods. A resource element consists of one symbol period and one subcarrier (a 15 KHz frequency range). A resource block (RB) may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a cell-specific reference signals (CRS) and a UE-specific RS (UE-RS). UE-RS may be transmitted on the resource blocks associated with physical downlink shared channel (PDSCH). The number of bits carried by each resource element may depend on the modulation scheme (the configuration of symbols that may be selected during each symbol period). Thus, the more RBs that a UE receives and the higher the modulation scheme, the higher the data rate may be for the UE.

In some cases, a wireless communications system may utilize one or more enhanced component carriers (eCCs). An eCC may be characterized by one or more features including: flexible bandwidth, variable length transmission time interval (TTIs), and modified control channel configuration. In some cases, an eCC may be associated with a carrier aggregation configuration or a dual connectivity configuration (i.e., when multiple serving cells have a suboptimal backhaul link). An eCC may also be configured for use in unlicensed spectrum or shared spectrum (where more than one operator is licensed to use the spectrum). An eCC characterized by flexible bandwidth may include one or more segments that may be utilized by UEs 115 that are not capable of monitoring the whole bandwidth or prefer to use a limited bandwidth (e.g., to conserve power).

According to the present disclosure, device within system 100—e.g., base stations 105 and UEs 115—may use enhanced carrier aggregation (eCA) to increase the throughput of a communications link. A UE 115 may receive a joint grant from a base station 105, for example, and the joint grant may include control information for all of the configured CCs for the UE 115. The control overhead for a joint grant may be reduced by grouping the configured CCs. In some examples, a UE 115 may receive an individual grant, which may include DCI associated with multiple CCs. Alternatively, the joint grant or the individual grant per CC may be combined with an individual grant associated with a single CC. The number of bits available in a DCI message after including CC scheduling information may determine an allocation granularity for RB allocation within each component carrier.

Figure 2:
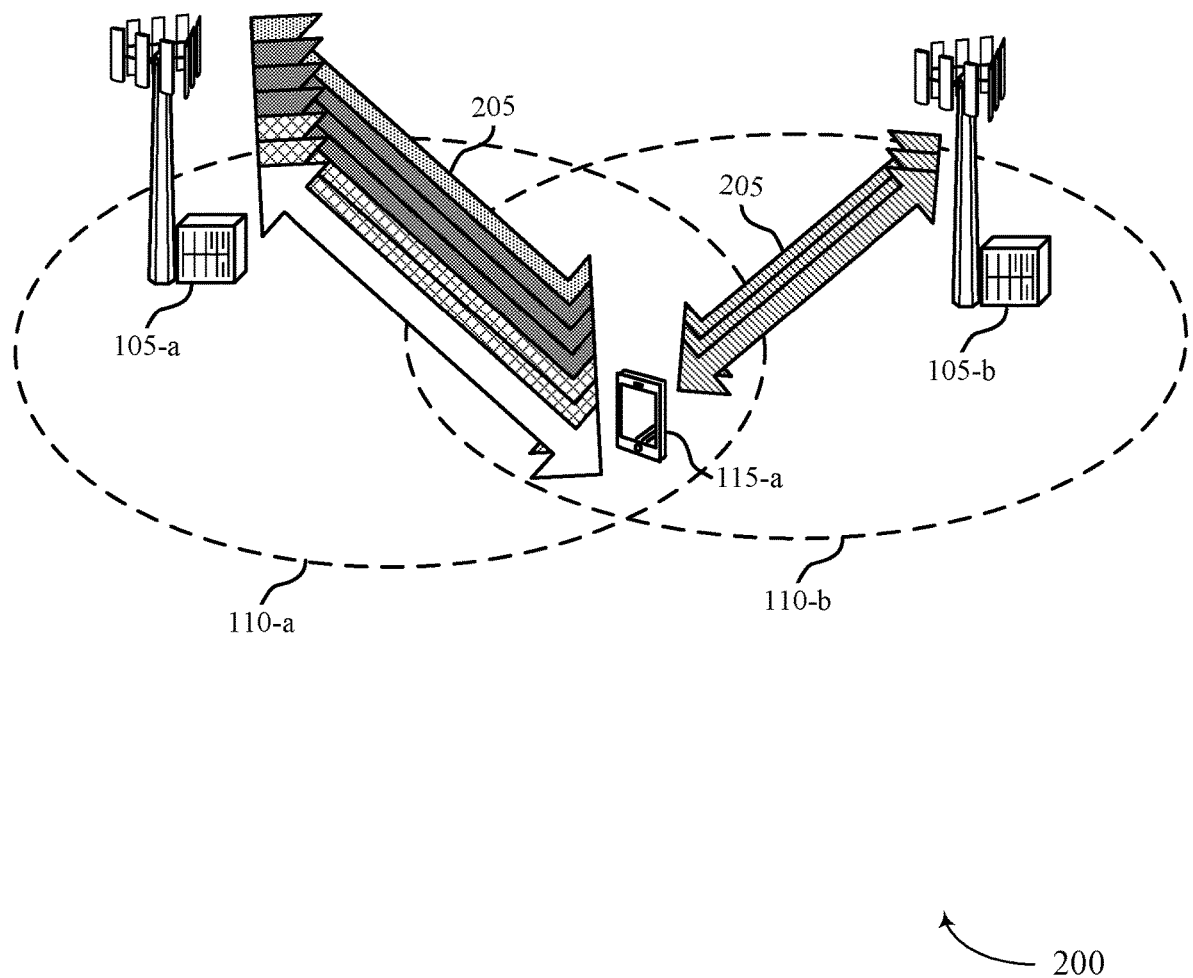
FIG. 2 illustrates an example of a wireless communications system that supports joint control for eCA in accordance with various aspects of the present disclosure.

FIG. 2 illustrates an example of a wireless communications system 200 that supports joint control in eCA configurations in accordance with various aspects of the present disclosure. Wireless communications system 200 may include base station 105-a, base station 105-b, coverage area 110-a, and UE 115-a, which may be examples of a base station 105, a coverage area 110, or a UE 115 as described above with reference to FIG. 1. Base station 105-a, base station 105-b, and UE 115-a may communicate with one another via eCA transmissions 205 when UE 115-a is within coverage area 110-a as generally described above with reference to FIG. 1. The eCA transmissions 205 may include both downlink and uplink transmissions. Base station 105-a may use a first set of CCs to communicate with UE 115-a while base station 105-b may use a second set of CCs to communicate with UE 115-a.

The control overhead associated with multiple CCs may become unwieldy as the number of CCs increases (e.g., during eCA operation). In some cases, an alternative to a control scheme utilized with legacy carrier aggregation (e.g., CA for up to five CCs) may be employed in order to efficiently schedule and utilize available resources. Base station 105-a may configure a number of CCs (e.g., 32 CCs)

for use by UE 115-*a*, and base station 105-*a* may utilize a DCI configuration appropriate for the eCA operation. For instance, joint grants, individual grants per CC group, or a combination of joint and individual grants may be used for scheduling (e.g., cross-carrier scheduling) and efficient resource assignment of scheduled CCs. The DCI may be included in the resource grant message during one or more eCA transmissions 205. A downlink CC may include a downlink control channel or a downlink shared channel or both and, in the case of a downlink eCA transmission 205, the resource grant message may be transmitted in a control or data region of the downlink CC.

In some cases, the number of bits allocated to the DCI may be semi-statically determined based on the number of configured CCs. The DCI may include a scheduling bitmap for the scheduled CCs, content or scheduling information (e.g., HARQ info, MCS, new data indicator (NDI), redundancy version (RV), data assignment index (DAI), and precoding), and RB assignment information. The scheduling bitmap may identify scheduled CCs and the number of bits used may be equal to the number of configured CCs. Additionally, the number of bits used for RB assignment may determine the RB assignment granularity. In some cases, the number of bits available for RB assignment may be inversely related to the number of scheduled CCs; that is, in some examples, the more scheduled CCs there are, the fewer bits remain in a DCI message to allocate RBs in each CC. The RB assignment granularity may also depend on whether the one or more eCA transmissions 205 comprise uplink or downlink transmissions. The adaptive RB granularity used in a joint grant may significantly reduce the overhead associated with eCA as compared with an control scheme that may be employed with five or fewer CCs.

In some cases, the overhead may be further decreased by generating the scheduling bitmap and scheduling information per group of CCs, rather than by individual CC. A grant may be intended for a specific subset of configured CCs, and the subsets may be defined by RRC signaling. The number of bits used for RB assignment may be based on the composite bandwidth of all the CCs in the group. As an example, a granularity of N RBs may be utilized for a single 20 MHz carrier and a granularity of 3N may be used for a combined bandwidth of 60 MHz.

In other examples, base station 105-*a* may transmit a joint grant or a grant for a specific CC group in combination with a grant for an individual CC during a single set of eCA transmissions 205. The joint grant or group specific grant may be used in a scenario that allows for lower granularity while the individual grant may be used to provide higher granularity for certain CCs. In some cases, the number of cells that may be individually granted may be limited, such as to 5 or 8 CCs. This may allow base station 105-*a* to avoid using the larger joint grant for specific allocations.

Individual and joint grants may be also be utilized according to whether an allocation is for the downlink or uplink. For instance, individual CCs may be configured to use joint grants on the downlink, individual grants on the uplink, individual grants on the downlink, joint grants on the uplink, or any combination thereof. Similarly, link-specific utilization of joint and individual grants can be extended to CC groups such that individual CCs are configured into CC groups and joint grants are used according to whether an allocation is for the downlink or the uplink. Depending upon a CC's configuration, a UE may be required to monitor for either a joint grant or an individual grant but not both.

Figure 3A:
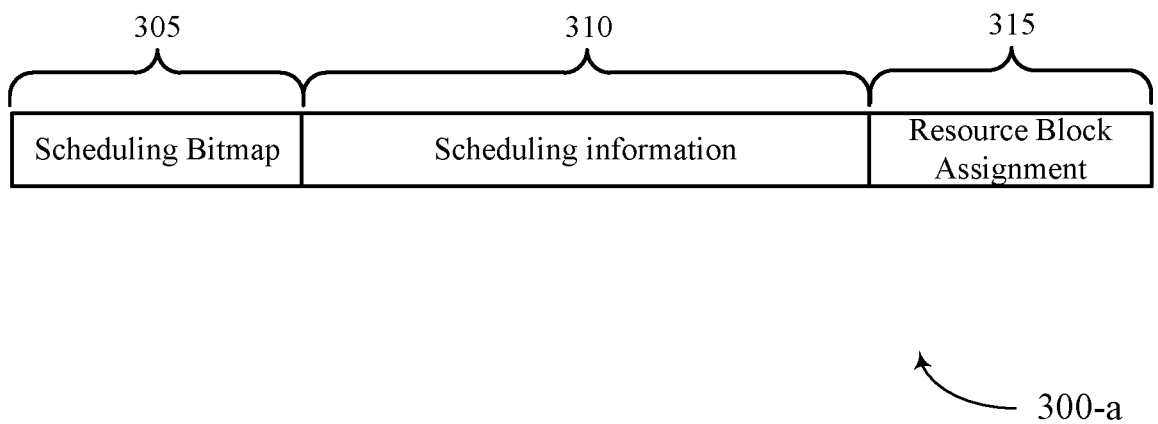
FIGS. 3A and 3B illustrate examples of DCI structures that support joint control for eCA in accordance with various aspects of the present disclosure.

FIG. 3A illustrates an example of a DCI structure 300-*a* that supports joint control in eCA configurations in accordance with various aspects of the present disclosure. DCI structure 300-*a* may illustrate aspects of a transmission between a UE 115 and a base station 105, as described above with reference to FIGS. 1-2. The DCI structure 300-*a* may include a scheduling bitmap 305, scheduling information 310 and RB assignment field 315 and may be used in joint cross-carrier control. DCI structure 300-*a* may be included in a transmitted resource grant.

In some cases, DCI structure 300-*a* may provide cross-carrier control information per CC. The length (e.g., the number of allocated bits) of DCI structure 300-*a* may be semi-statically determined based on the number of CCs configured for cross carrier control. Scheduling bitmap 305 may be used to determine which CCs are scheduled from the group of configured CCs. The number of bits used by scheduling bitmap 305 may be equal to the number of configured CCs (e.g., 32 bits for 32 CCs). The bits allocated to scheduling information 310 may be based on the number of scheduled CCs. In some examples, the bits of scheduling bitmap 305 may correspond to CC groups rather than individual CCs.

Scheduling information 310 may include hybrid automatic repeat-request (HARQ) info, transmit power control (TPC), modulation and coding scheme (MCS), new data indicator (NDI), redundancy version (RV), data assignment index (DAI), and precoding information for each scheduled CCs. The MCS information may include separate fields for new and re-transmissions. The redundancy version may be omitted for new transmissions or set to a fixed value (e.g., zero).

The bits allocated to RB assignment field 315 may be based on the bits that remain after allocating bits to the scheduling bitmap 305 and scheduling information 310. RB assignment granularity may increase as more bits are available for RB assignment. For instance, DCI structure 300-*a* may be allocated a total of T bits; scheduling bitmap 305 may be allocated C bits; scheduling information 310 may be allocated S bits; and RB assignment field 315 may be allocated RB bits. The number of bits available for RB assignment field 315 may be determined using:

$$RB_{bits} = T_{bits} - C_{bits} - S_{bits} \qquad (1)$$

Equation 1 illustrates the dependence of the leftover bits available for RB assignment of the CCs after accounting for the scheduling information and scheduling bitmap. The number of available bits for RB assignment may be based on the number of scheduled CCs. For instance, as more CCs are scheduled the bits S allocated to scheduling information 310 may increase and the number of bits, RB, available for RB assignment may decrease. In some cases, all of the configured CCs may be scheduled and there may be no additional bits for RB assignment. This may correspond to a coarse allocation scheme in which the DCI information may communicate, through scheduling bitmap 305, whether the whole bandwidth of a CC is scheduled.

In another example, DCI structure 300-*a* may provide cross-carrier control information per group of CCs. The RRC configuration may be used to define the CC groups (e.g., the RRC configuration may determine the number of groups and how each CC is associated with a group). The number of groups may be limited (e.g., to 8 groups of 4 CCs in some examples). The number of bits used by scheduling information 310 may be based on the number of scheduled CC groups. The scheduling information (e.g., MCS, HARQ info, etc.) may be common to each CC in the group. In some cases, scheduling information may be given per group even if the bitmap represents individual CCs. If at least one CC from a group is scheduled, the scheduling information may be provided for that group. The RB allocation may be done per CC, or the RBs of the scheduled CCs within a group may be considered jointly (e.g., indexed jointly based on serving cell ID). As before, the bits remaining after allocating bits to the scheduling bitmap 305 and scheduling information 310 may be allocated to RB assignment field 315 and provide allocation granularity.

Thus, DCI structure 300-*a* may, for example, be allocated a total of T bits; scheduling bitmap 305 may be allocated C bits (representing individual CCs); scheduling information 310 may be allocated S*G bits, where S is the number of bits used for individual specification of the scheduling information and G is the number of assigned groups. The number of bits available for RB assignment field 315 may be determined using:

$$RB_{bits} = T_{bits} - C_{bits} - S_{bits}*G \qquad (2)$$

In other examples, the number of bits used by scheduling bitmap 305 may be based on the number of CC groups and the number of bits used by scheduling information 310 may also be based on the number of scheduled CC groups. In this example, DCI structure 300-*a* may be allocated a total of T bits; scheduling bitmap 305 may be allocated C*G bits, where G is the number of assigned groups; scheduling information 310 may be allocated S*G bits; and RB assignment field 315 may be allocated RB bits. The number of bits available for RB assignment field 315 may be determined using equation 3:

$$RB_{bits} = T_{bits} - C_{bits}*G - S_{bits}*G \qquad (3)$$

DCI structure 300-*a* may be used in combination with grants for individual CCs. In some cases, the joint grant may be used in cases where scheduling granularity may be coarse and the individual grant may be used to provide finer granularity and/or usage of the joint grant may depend upon whether the allocation is for the uplink or downlink. A UE 115 may receive joint and individual grants in a TTI for the same or different cells. In some cases, if an individual grant has been transmitted for a cell, that cell may be omitted from a joint grant occurring in the same TTI. This may allow increased efficiency in the case where a small number of cells are scheduled to a UE.

Figure 3B:
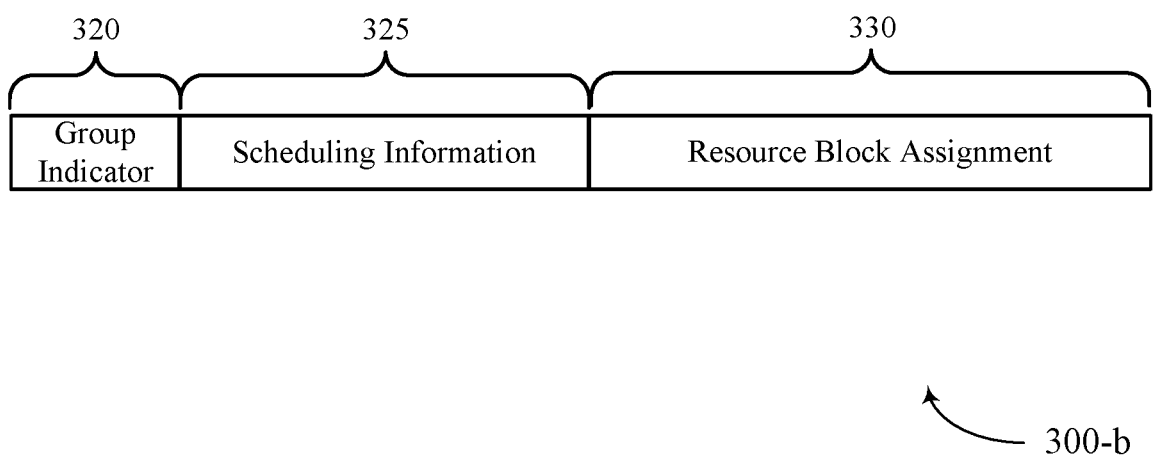

FIG. 3B illustrates an example of a DCI structure 300-*b* for group control in eCA configurations in accordance with various aspects of the present disclosure. DCI structure 300-*b* may illustrate aspects of a transmission between a UE 115 and a base station 105, as described above with reference to FIGS. 1-2. The DCI structure 300-*b* may include a group indicator 320, scheduling information 325 and RB assignment field 330 and may be used in joint cross-carrier control. DCI structure 300-*b* may be included in a transmitted resource grant.

The number of bits allocated to group indicator 320 may be based on the number of configured CC groups (i.e., it may indicate a group index). CC groups may be configured for both uplink and downlink operation and group indicator 320 can serve as an index to the respective collections. The number of bits used by scheduling information 325 (e.g., MCS, HARQ info, etc.) may be common to each CC within a scheduled group or it can vary. The number of bits used for RB assignment field 330 may be based on the composite bandwidth of all the CCs in the group. For example, a fixed granularity of N RBs may be utilized for a 20 MHz carrier and a granularity of 3N may be used for 60 MHz. RB assignment field 330 may also accommodate units with different sizes. For instance, a new allocation unit for use with joint grants may be defined as including a predetermined number of resource blocks (also referred to as enhanced RBGs (eRBG)). When the system bandwidth is not an integer multiple of the selected eRBG unit, the additional bandwidth may be included with one or more bits of RB assignment field 330. Continuing with the previous example, if the 20 MHz system bandwidth is represented as 100 RBs, and if the joint grant is configured to schedule 4 CCs, then the RB assignment field 330 might represent 6 eRBGs, the first 5 each having a size of 16 RBs, and the last eRBG representing the remaining 20 RBs. Other eRBG sizing is possible, including representing the eRBG as a square of the standard RBG (e.g., if RBG is 3 RBs, eRBG is 9 RBs), etc. Table 1 shows one such exemplary arrangement.

TABLE 1

| System Bandwidth (RBs) | RBG (RBs) | eRBG for Joint Grant (RBs) |
|---|---|---|
| 6-10 | 1 | 4 |
| 11-26 | 2 | 8 |
| 27-63 | 3 | 12 |
| 64-110 | 4 | 16 |

In some cases, DCI structure 300-*b* may provide control information for cross-carrier control based on the bandwidth of the configured CCs. The number of RBs to be scheduled may be equal to the sum of all RBs of the configured CCs. This may be denoted as $N_{RB}$. Consecutive numeration of the RBs may be used based on the serving cell index (e.g., according to the ascending serving cell index). In some examples, the localized resource assignment may start from a given RB, $N_{RBstart}$, and include consecutive RBs up to $N_{RB} - N_{RBstart} - 1$. Similar techniques may be used for distributed resource assignment. The number of bits used for resource allocation may be based on the composite number of RBs of all configured CCs. The scheduling information may be the same for all of the scheduled resources.

DCI structure 300-*b* may be used in combination with an individual grant. In some cases, the group grant may be used in cases where scheduling granularity may be moderately coarse and the individual grant may be used to provide finer granularity. A UE may receive joint, group, and individual grants in the same TTI for the same or different cells. In some cases, if an individual grant has been transmitted for a cell, that cell may be omitted from a joint or group grant occurring in the same TTI such that the UE may be required to monitor only for corresponding DCI formats. Also, the number of DCI formats can be minimized to reduce the burden on UEs. In one example, only two DCI formats for DL grants, one for CRS-based and the other for DM-RS based grants, are utilized. This may allow increased efficiency in the case where a small number of cells are scheduled to a UE.

Figure 3C:
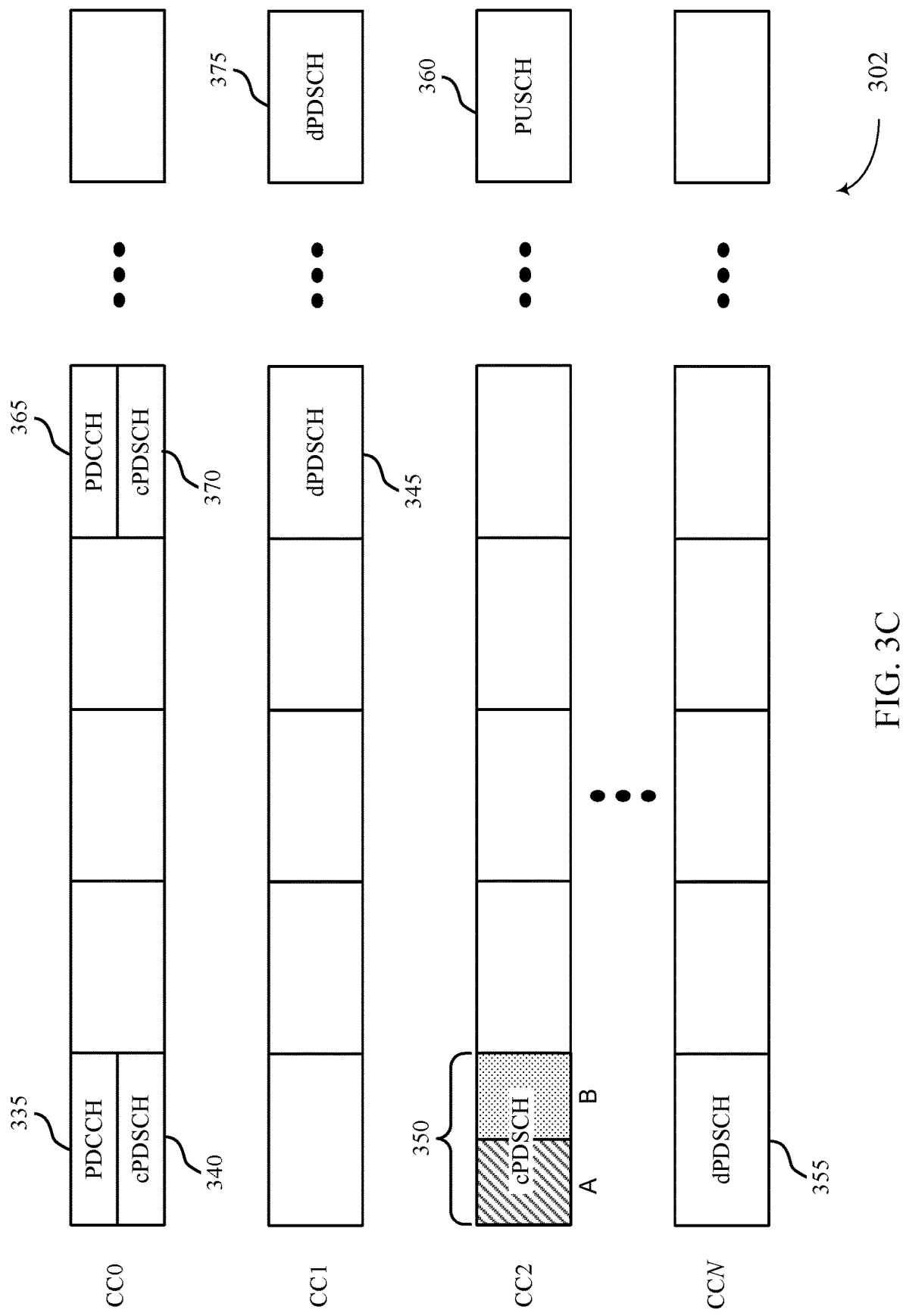
FIG. 3C illustrates exemplary communications that support joint control for eCA in accordance with various aspects of the present disclosure.

FIG. 3C illustrates exemplary eCA communications 302 that support joint control for eCA in accordance with various aspects of the present disclosure. The eCA communications 302 may be an example of communications between a base station 105 and a UE 115. A total of N CCs, CC0-CCN, where N can be any whole number, are configured for communication between the base station 105 and UE 115. The management of the eCA for the UE 115 may be conducted where a two-stage assignment provides scheduling and assignment for each of CC0-CCN carriers. The UE 115 may blind decode PDCCH 335 in CC0 to obtain an assignment indication identifying resources for a control PDSCH (cPDSCH), such as cPDSCH 340 or cPDSCH 350. The assignment indication may also include a control flag that alerts the UE 115 that the identified PDSCH is a cPDSCH and not merely a regular PDSCH. The assignment indication further allows the UE 115 to decode the identified cPDSCH, such as cPDSCHs 340 or 350, in order to obtain the scheduling and assignment information and control messages for any one or more of the configured CCs, CC0-CCN.

It should be noted that cPDSCH 340 illustrates one example cPDSCH that is transmitted in the same subframe and same carrier, CC0, as its corresponding PDCCH, PDCCH 335. cPDSCH 350 is illustrated as another, independent example cPDSCH that is transmitted in the same subframe as PDCCH 335, but in a different carrier, CC2. While both cPDSCH 340 and cPDSCH 350 are illustrated in FIG. 3C, they may represent different example implementations illustrated in FIG. 3C and are not necessarily illustrated together to represent two separate cPDSCH transmissions that are both transmitted in relation to PDCCH 335.

It should further be noted that, as illustrated in FIG. 3C, the blocks representing subframes that include representations of PDCCH, cPDSCH, dPDSCH, PUSCH, and the like, are conceptual block representations and are not intended to provide detail of the structure of any particular subframe or the actual portion of the illustrated subframes in which such channels would typically be located. The block representations illustrated in FIG. 3C are intended merely to show presence of such channels in a particular subframe.

In addition to the scheduling and assignment information for the configured CCs, the control PDSCH, such as cPDSCHs 340 and 350, may contain various additional control messages. For example, the cPDSCH may include downlink and uplink assignments for any or all of the configured CCs. cPDSCH 340 ay include downlink assignment from a base station 105 of dPDSCH 345 on CC1, while cPDSCH 350 may include downlink assignment dPDSCH 355 on CCN and uplink assignment PUSCH 360 on CC2. The control PDSCH, such as cPDSCHs 340 and 350, may also include other control information, such as HARQ information for uplink transmission and supporting control information, such as control format indicators (CFIs) that are typically carried in PCFICH for all carriers. A CFI is an indicator that identifies how many OFDM symbols are used for carrying a control channel (e.g., PDCCH, PHICH, etc.) at each subframe. Thus, a UE 115 would obtain such information in cPDSCH 340 and/or 350 instead of attempting to detect PCFICH for any of the configured CC0-CCN.

Another benefit of including this information within PDSCH is the protection provided by PDSCH transmission through rate control and error detection coding, such as cyclic redundancy check (CRC), repetition codes, parity bits, checksums, and the like. Thus, the control information and control messages transmitted with cPDSCHs 340 and 350 may be error protected and reliable, which may reduce the interpreting/pruning logic for PDCCH at a UE 115, and which may contribute significant complexity in control channel processing. The error protection may also decrease the rate of false alarm/miss detection with multiple control channels, such as HARQ.

With PDSCH rate control, the control PDSCH, such as cPDSCHs 340 and 350, may use MIMO, precoding, and MCS control for the transmission. Control PDSCH may also use HARQ procedures when downlink data assignments are assigned to future subframes. For example, because cPDSCH 340 includes a data downlink assignment of dPDSCH 345 that is four subframes from cPDSCH 340, a UE 115 and a base station 105 may use standard HARQ procedures. Thus, if the base station 105 fails to receive an ACK from the UE 115 for cPDSCH 340 by the subframe containing dPDSCH 345, the base station 105 may either decide to retransmit the control information for the configured CCs, CC0-CCN, within dPDSCH 345, if timing allows such information to be added, or may cancel the scheduled data downlink of dPDSCH 345 and reassign those resources to other UEs 115 being served. When the data downlink is more time sensitive, for example, with cPDSCH 350 assigning dPDSCH 355 in the same subframe, there may not be sufficient time for HARQ procedures to successfully operate.

Additional aspects of the present disclosure may improve the reliability of the cPDSCH by using a more conservative rank and MCS selection. Standard rank and MCS values are selected by the network to achieve a target block error rate (BLER) of 10% for normal PDSCH. However, in order to improve the reliability of cPDSCH decoding, a base station 105 may select a more conservative rank and MCS to achieve a lower target BLER, such as 5%, 3%, 1%, and the like. When sending cPDSCH, such as cPDSCHs 340 and 350, a base station 105 may select a beneficial rank and MCS that may improve the BLER and communicate the new rank and MCS to the UE 115 in PDCCH 335 with the assignment indication.

Additional aspects of the present disclosure may also provide an improved design for efficiently arranging information within the cPDSCH. For example, in one aspect, the cPDSCH subframe, such as the subframe of cPDSCH 350, may be split into multiple parts, A and B. The information may be arranged across the multiple parts in order to increase the efficiency with which the receiver may decode the information. The first slot A may carry time critical information, such as downlink assignments for the same subframe, such as dPDSCH 355. The second slot B may carry information that is more delay tolerant, such as HARQ for uplink and uplink assignments, such as PUSCH 360.

Further aspects of the present disclosure may provide for multiple rounds of decoding for the cPDSCH to opportunistically improve the decoding timeline. In such aspects, a UE 115 does not need to wait for the entire control PDSCH subframe to be received in order to perform decoding. With respect to the division of the cPDSCH subframe into multiple parts discussed above with cPDSCH 350A and B, the time critical information included in the first slot A may be decoded before the entire cPDSCH subframe of cPDSCH 350 as been received, thus, allowing the UE 115 to immediately begin processing the time critical control information. Therefore, the UE 115 may start decoding at multiple time points in the subframe, and, if control information is decoded early, the UE 115 may start processing the decoded information, such as by processing data CCs, such as dPDSCH 355 in CCN, before the entire subframe has been received.

The cPDSCH may point to downlink data PDSCH which can be in the same subframe, as cPDSCH 350 points to dPDSCH 355 in the same subframe, or in later subframes, as cPDSCH 340 points to dPDSCH 345 in a future subframe when the delay for the data scheduled for dPDSCH 345 is not very critical. The cPDSCH uplink assignments may point to a future subframe, as cPDSCH 350 also includes an uplink assignment for PUSCH 360 at a later subframe. When the data PDSCH is in a later subframe, the UE 115 may not need to monitor the other CCs until closer to the assigned future subframe. For example, if PDCCH 335 points only to cPDSCH 340, which includes the data downlink assignment of dPDSCH 345 in a later subframe, the UE 115 may deactivate its receive chains until just prior to dPDSCH 345. cPDSCH 340, thus, may serve as a quick indication for the UE 115 to turn on other CCs reception.

Provisioning the UE 115 to dynamically turn on more CCs when needed may help in power saving. Once an additional CC is turned on, the UE 115 may use an activity timer in order to turn the CC back off. Therefore, if no additional data assignments or other control PDSCH arrive between the subframe at dPDSCH 345 and the expiration of the activity timer, the UE 115 can turn off the receive chain for CC1. When the additional CC is turned on, a later control PDSCH that arrives before expiration of the activity timer may schedule a data PDSCH in the same subframe, reducing delay for such future transmissions. For example, when the UE 115 turns on the receive chain for CC1 for dPDSCH 345, base station 105 has scheduled another PDCCH 365, which includes an assignment indication pointing to cPDSCH 370 in the same subframe of CC0. The UE 115 begins the activity timer when activating the receive chain for CC1 and, prior to expiration, cPDSCH 370 is received that includes a time sensitive downlink assignment of dPDSCH 375. Thus, there may be no delay in activating the receive chain for CC1 as it is already on for the duration of the activity timer after reactivating for decoding of dPDSCH 345.

Figure 4:
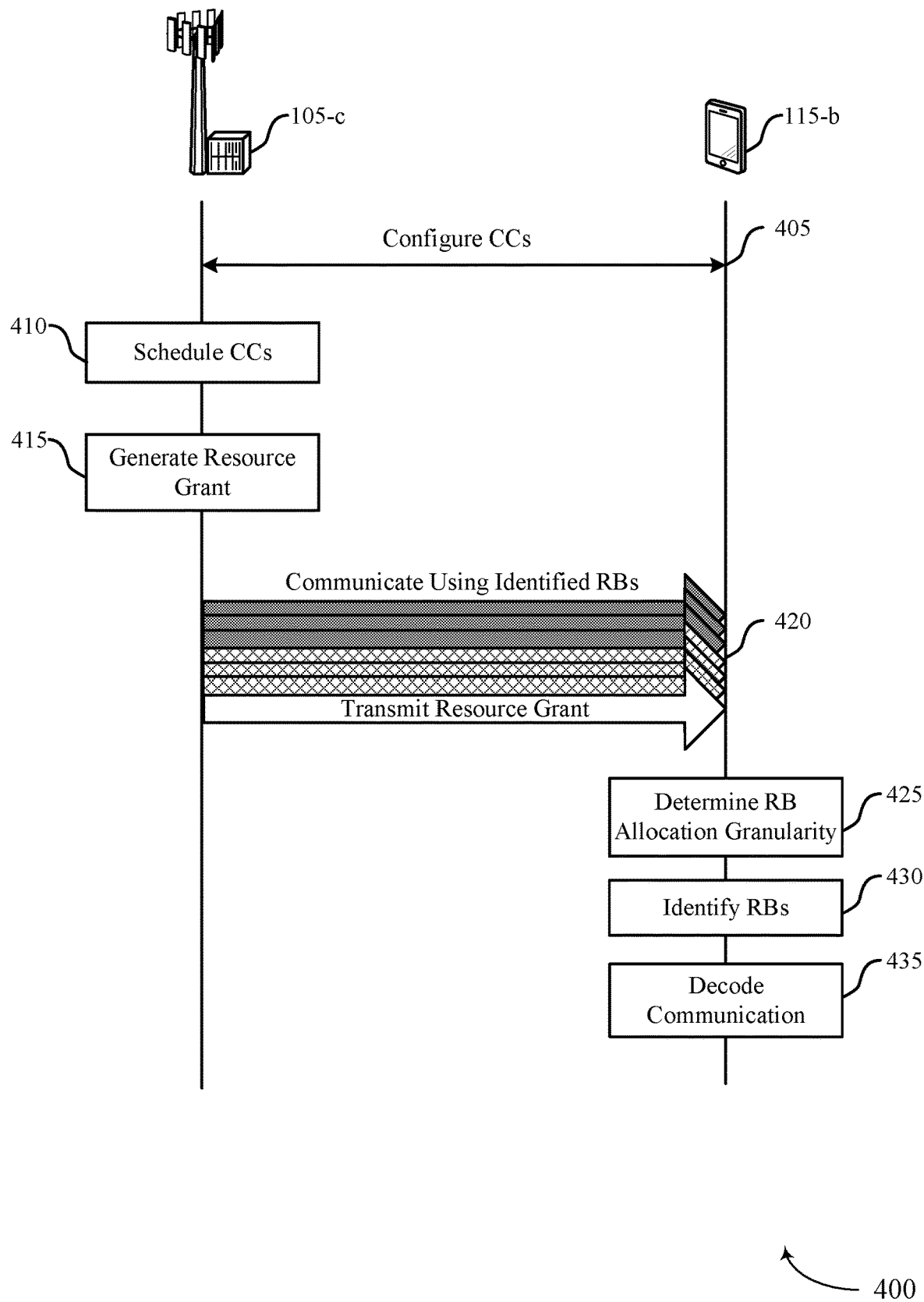
FIG. 4 illustrates an example of a process flow within a system that supports joint control for eCA in accordance with various aspects of the present disclosure.

FIG. 4 illustrates an example of a process flow 400 in system that supports joint control in eCA configurations in accordance with various aspects of the present disclosure. Process flow 400 may be performed by base station 105-*c* and UE 115-*b*, which may be examples of a base station 105 and a UE 115 described above with reference to FIGS. 1-2. Base station 105-*c* and UE 115-*b* may utilize eCA to increase throughput.

At step 405, base station 105-*c* may configure a set of CCs for a UE 115-*b*, and the CCs may be configured for cross-carrier control. The configured CCs may be uplink CCs or downlink CCs, or both. In some cases, an RRC configuration message may sent to UE 115-*b* to configure CCs. The configuration message may include an indication of the size of the resource grant. In some cases, the communication may include a group configuration message partitioning one or more of the CCs into groups. In some examples, the indication includes an index for each group.

At step 410, base station 105-*c* may schedule a number of the configured CCs for eCA operation, including uplink or downlink CCs. In some cases, base station 105-*c* may schedule a different set of configured CCs for each TTI, or semi-statically schedule the CCs. In some examples, base station 105-*c* may schedule one or more groups of the configured CCs.

At step 415, base station 105-*c* may generate a resource grant message. The resource grant may include control information and in some cases the size of the resource grant may be configured semi-statically. In some cases, the resource grant may include DCI for an upcoming communication. The resource grant size may be based on a DCI length which may be may be configured per TTI. In some cases, the DCI length may be based on the number of configured CCs. The DCI may include a scheduling bitmap, where each bit of the scheduling bitmap corresponds to one of the configured CCs or CC groups. The DCI may also include scheduling information such as an MCS indication, a HARQ indication, an new data indicator (NDI), a redundancy version (RV) indication, a transmit power control (TPC) command, a precoding indication, or a data assignment index (DAI) indication, or any combination thereof. In some examples each set of scheduling information corresponds to a scheduled CC. In other cases, the scheduling information is provided based on CC group. In some examples, the one or more sets of scheduling information may include first scheduling information for at least one of the scheduled CCs and second scheduling information for at least two of the scheduled CCs.

The DCI may also include resource allocation information. The resource allocation granularity may be based on the number of resource allocation bits in the resource grant message. In some cases, the number of scheduled CCs may influence the resource allocation granularity—e.g., if more bits are used for scheduling information, fewer bits may be reserved for RB allocation. The resource allocation granularity may also be based on whether the scheduled CCs comprise uplink CCs or downlink CCs. In some instances, the granularity may be based on whether the resource grant message comprises a message in a control region or a data region of a downlink CC.

In some examples, each bit of the scheduling bitmap corresponds to a group of CCs and the scheduling information may correspond to the CC group. Then the number of scheduled CC groups may influence or affect the resource allocation granularity. In some cases, the resource grant size may be based on the composite bandwidth of a group of scheduled CCs. The resource allocation may also be based on a composite bandwidth of the group of scheduled CCs. In some cases the resource allocation may be based on a joint RB indexing configuration of at least two of the configured CCs.

At step 420, base station 105-*c* and UE 115-*b* may communicate using the configured CCs. For example, base station 105-*c* may transmit a signal to UE 115-*b*, which may include a resource grant and a number of information blocks associated with the resource grant. The resource grant message may include an indication of the scheduled CCs and a resource allocation associated with a resource allocation granularity. The resource grant may include a message in the control region or the data region of a downlink CC and may be sent over a downlink control channel or a downlink shared channel. In some examples, UE 115-*b* may receive an additional resource grant message for an additional single configured CC.

Additionally or alternatively at step 420, UE 115-*b* may receive from base station 105-*c* a group configuration message partitioning the configured CCs into one or more groups of CCs. The configured CCs may be partitioned into one or more groups of CCs based on whether the scheduled CCs include uplink CCs or downlink CCs. In such cases, UE 115-*b* may receive multiple resource grant messages, where each resource grant message corresponds to a group of CCs in the one or more groups of CCs. In some cases, at least one group of CCs includes downlink CCs and each downlink CC of the group is associated with a same uplink control channel.

At step 425, UE 115-*b* may decode the resource grant and determine the RB allocation granularity. For example, UE 115-*b* may identify the number of bits used for RB allocation, and infer the granularity. In some cases, the RB granularity may also be based on a number of indexed RBs within the bandwidth of each CC (or within a jointly indexed bandwidth).

In some examples, UE 115-*b* may decode the resource grant to obtain an assignment indication identifying resources for a cPDSCH. The assignment indication may also include a control flag that alerts UE 115-*b* that the identified PDSCH is a cPDSCH and not merely a regular PDSCH. The assignment indication further allows UE 115-*b* to decode the identified cPDSCH in order to obtain the scheduling and assignment information and control messages for any one or more of the configured CCs.

At step 430, UE 115-*b* may identify a set of RBs on the scheduled CCs based on the generated resource grant. Base station 105-*c* may use the identified RBs to communicate with UE 115-*b*. Or, in the case of uplink, UE 115-*b* may use the identified RBs to communicate with base station 105-*c* and may, for example, transmit a common HARQ feedback message for the scheduled CCs. In some cases, base station 105-*c* may identify the RBs based on the resource allocation granularity and a RB indexing configuration (for one or more CCs).

At step 435, UE 115-*b* may decode the data from base station 105-*c* transmitted on the identified RBs. Or, base station 105-*c* may decode the data received from UE 115-*b*.

In some cases, e.g., for a set of CCs configured for UE 115-*b* in an eCA configuration, individual (CC-specific) grants and joint (scheduling two or more CCs) grants may be supported. In one example, CCs configured for UE 115-*b* may be further configured into a first subset of DL CCs configured for individual grants and a second subset of DL CCs configured for joint grants, while the UL CCs may have a third subset of UL CCs configured for individual grants and a fourth subset of UL CCs configured for joint grants. The first subset may not be equal to the third subset, and the second subset may not be equal to the fourth subset. That is, the management of individual and joint grants can be done separately for DL and UL for UE 115-*b* using CA. Note also that a CC may be configured to be scheduled by both individual and joint grants. The UE 115-*b* may be configured to decode one of them at a time.

Under a joint grant, the resource allocation granularity can be based on an eRBG. In some cases, an eRBG may be defined as 4 resource block groups (RBGs). In some cases, the last eRBG may have a larger size. For example, for a 20 MHz system of 100 RBs, there may be 6 eRBGs, the first 5 eRBGs with 16 RBs, while the last one with 20 RBs. Other ways of defining eRBG are also possible. For example, an eRBG may be defined as a square of RBGs (e.g., if RBG is 3 RBs, eRBG is 9 RBs). Thus, for system bandwidth 6-10 RBs, the eRBG joint grant may be 4 RBs; 11-26 RBs system bandwidth may use 8 RB eRBGs; 27-63 may use 12 RBs, and 64-110 may use 16 RBs.

In a joint grant, separate modulation and coding scheme (MCS) information fields may be used for new and re-transmissions. That is, one MCS may be used for new transmissions, and another MCS may be used for HARQ re-transmissions. Each MCS may be shared by all CCs in the joint grant. In some cases, redundancy versions (RVs) may be used for re-transmissions, and new transmissions may use a fixed RV (e.g. 0). Furthermore, the number of DCI formats for joint grants may be minimized. For example, two DCI formats may be used for DL grants (e.g., one for CRS based grants and the other for DM-RS-based grants).

Figure 5:
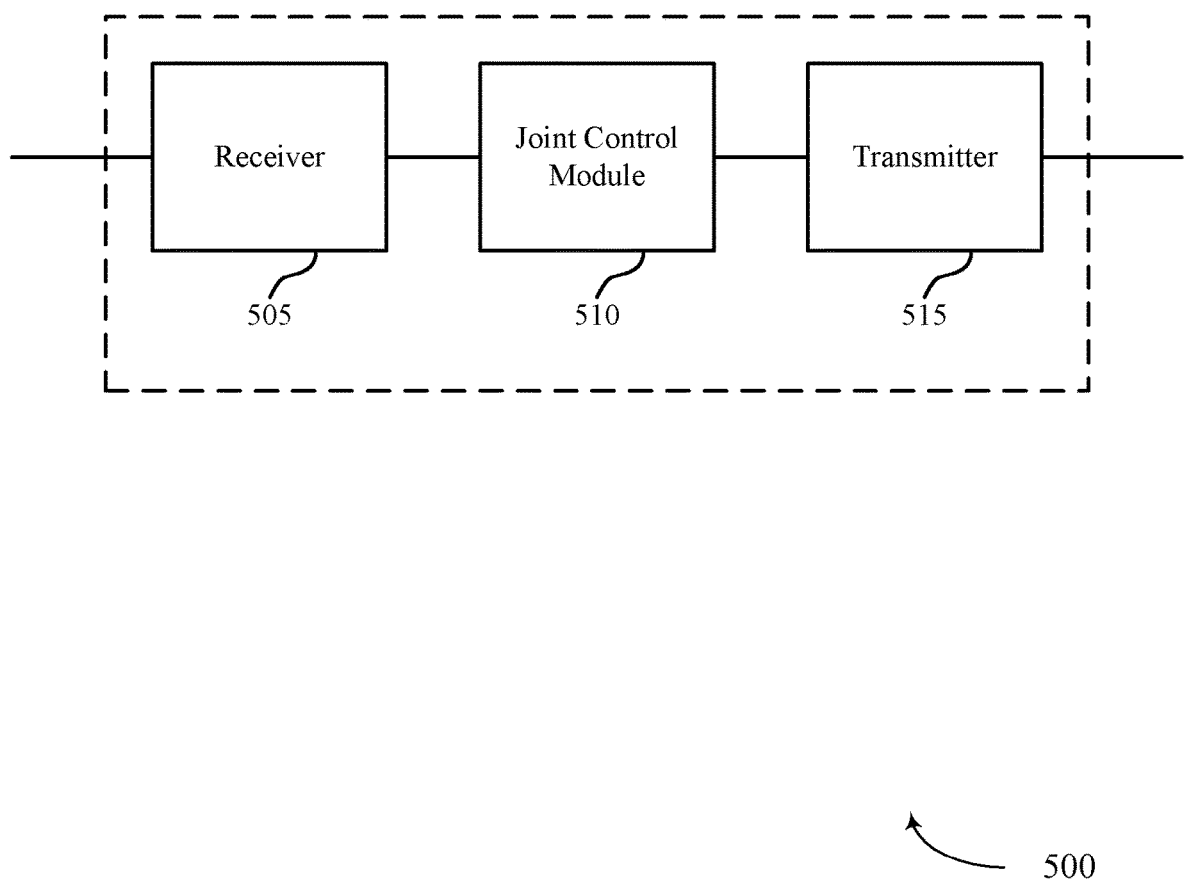
FIG. 5 shows a block diagram of an exemplary wireless device that supports joint control for eCA in accordance with various aspects of the present disclosure.

FIG. 5 shows a block diagram of an exemplary wireless device 500 that supports joint control in eCA configurations in accordance with various aspects of the present disclosure. Wireless device 500 may be an example of aspects of a UE 115 described with reference to FIGS. 1-4. Wireless device 500 may include a receiver 505, a joint control module 510, or a transmitter 515. Wireless device 500 may also include a processor. Each of these components may be in communication with each other.

The receiver 505 may receive information such as packets, user data, or control information associated with various information channels (e.g., control channels, data channels, and information related to joint control for eCA, etc.). Information may be passed on to the joint control module 510, and to other components of wireless device 500. In some examples, communicating on a set scheduled CCs comprises receiving one or more data blocks on a set of RBs. In some examples, the receiver 505 may receive a configuration message indicating the size of the resource grant message.

The joint control module 510 may receive a resource grant message for a plurality of configured CCs, and the resource grant may include an indication of scheduled CCs from the plurality of configured CCs for a subframe. The reception may be performed in combination with receiver 505. A resource allocation granularity associated with the resource grant message may be based on a number of the scheduled CCs. The joint control module 510 may communicate on the scheduled CCs during the subframe in accordance with the resource grant message. This communication may be performed in combination with transmitter 515.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

Figure 6:
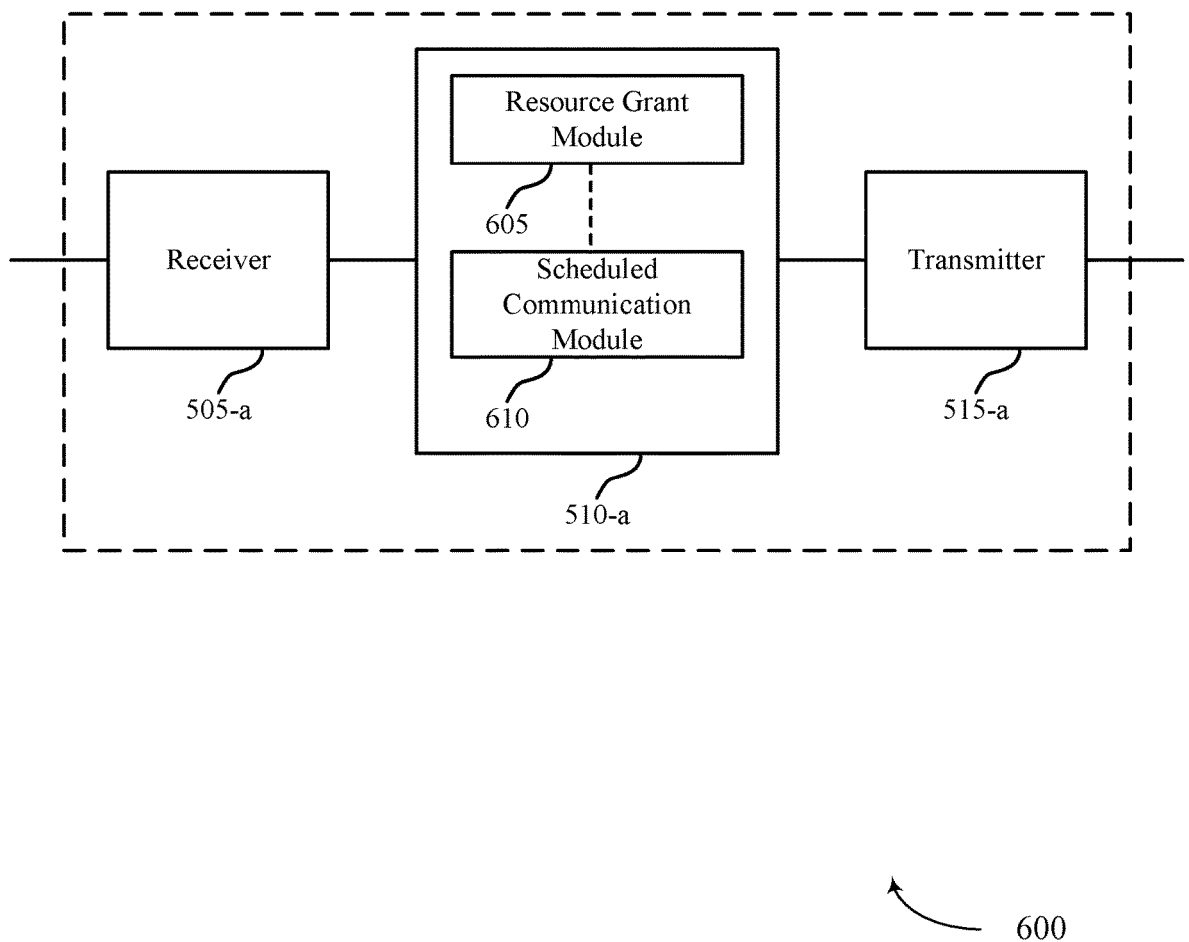
FIG. 6 shows a block diagram of an exemplary wireless device that supports joint control for eCA in accordance with various aspects of the present disclosure.

FIG. 6 shows a block diagram of an exemplary wireless device 600 that supports joint control in eCA configurations in accordance with various aspects of the present disclosure. Wireless device 600 may be an example of aspects of a wireless device 500 or a UE 115 described with reference to FIGS. 1-5. Wireless device 600 may include a receiver 505-*a*, a joint control module 510-*a*, or a transmitter 515-*a*. Wireless device 600 may also include a processor. Each of these components may be in communication with each other. The joint control module 510-*a* may also include a resource grant module 605, and a scheduled communication module 610.

The receiver 505-*a* may receive information which may be passed on to joint control module 510-*a*, and to other components of wireless device 600. The joint control module 510-*a* may perform the operations described above with reference to FIG. 5. The transmitter 515-*a* may transmit signals received from other components of wireless device 600.

The resource grant module 605 may receive a resource grant message for a plurality of configured CCs that includes an indication of scheduled CCs from the plurality of configured CCs for a subframe, and a resource allocation granularity associated with the resource grant message may be based on a number of the scheduled CCs as described above with reference to FIGS. 2-4. The granularity may be also be based on whether the scheduled CCs are uplink CCs or downlink CCs. In some examples, a size of the resource grant message may be based on a number of configured CCs. In some examples, the size of the resource grant message comprises a semi-static DCI length. A resource allocation of the resource grant message may be based on a joint RB indexing configuration for at least two of the plurality of configured CCs. Additionally or alternatively, a size of the resource grant message may be based on the number of configured CCs. The resource grant module 605 may also receive a configuration message indicating the size of the resource grant message. In some examples, a resource allocation of the resource grant message may be based on a joint RB indexing configuration for at least two of the plurality of configured CCs. The resource grant message may be transmitted in a control or data region of a downlink control or shared channel.

The resource grant module 605 may also monitor for a downlink control channel in one or a subset of CCs of a plurality of CCs configured for the UE 115. Thus, the UE 115 may be configured to monitor just one CC, such as an anchor CC or another CC designed for the UE 115, or may monitor a subset of the total number of CCs. By monitoring fewer than the total number configured for the UE 115, power may be conserved at the UE 115.

Additionally or alternatively, the resource grant module 605 may receive an assignment indication with the downlink control channel, where the assignment indication identifies a controlling downlink shared channel assigned to the UE 115 with control information for one or more of the configured CCs. For example, the PDCCH may include an indicator to identify to the UE 115 that the PDSCH that it is pointing to is a control PDSCH. Thus, the resource grant module 605 may know to process the control PDSCH differently. Otherwise, the functionality of the PDCCH is similar to a regular PDCCH. The assignment indication for the control PDSCH received in the PDCCH may identify the resource blocks (RBs) allocated to the control PDSCH, whether located in the same CC or a different CC as the PDCCH, and also identify the parameters for the control PDSCH transmission, such as the MCS, rank, precoding matrix, HARQ parameters etc. The assignment indication may also include a control flag indicating that the assigned controlling downlink shared channel is configured for managing the plurality of CCs. In some examples, the downlink assignments for the one or more CCs may point to a downlink shared channel in one of a same subframe as the assigned controlling downlink shared channel or a future subframe.

The scheduled communication module 610 may communicate on the scheduled CCs during a scheduled subframe in accordance with the resource grant message as described above with reference to FIGS. 2-4. For example, scheduled communication module 610 may transmit a common HARQ feedback message for the scheduled CCs. In other examples, the scheduled communication module 610 may deactivate a receive chain associated with the one or more of the plurality of CCs corresponding to a received downlink assignment identifying downlink transmissions in the future subframe and reactivating the receive chain prior to the future subframe. In some cases, the scheduled communication module 610 may activate an activity timer in response to reactivating the receive chain and may deactivate the receive chain in response to expiration of the activity timer when no additional downlink assignments are received prior to the expiration.

Figure 7:
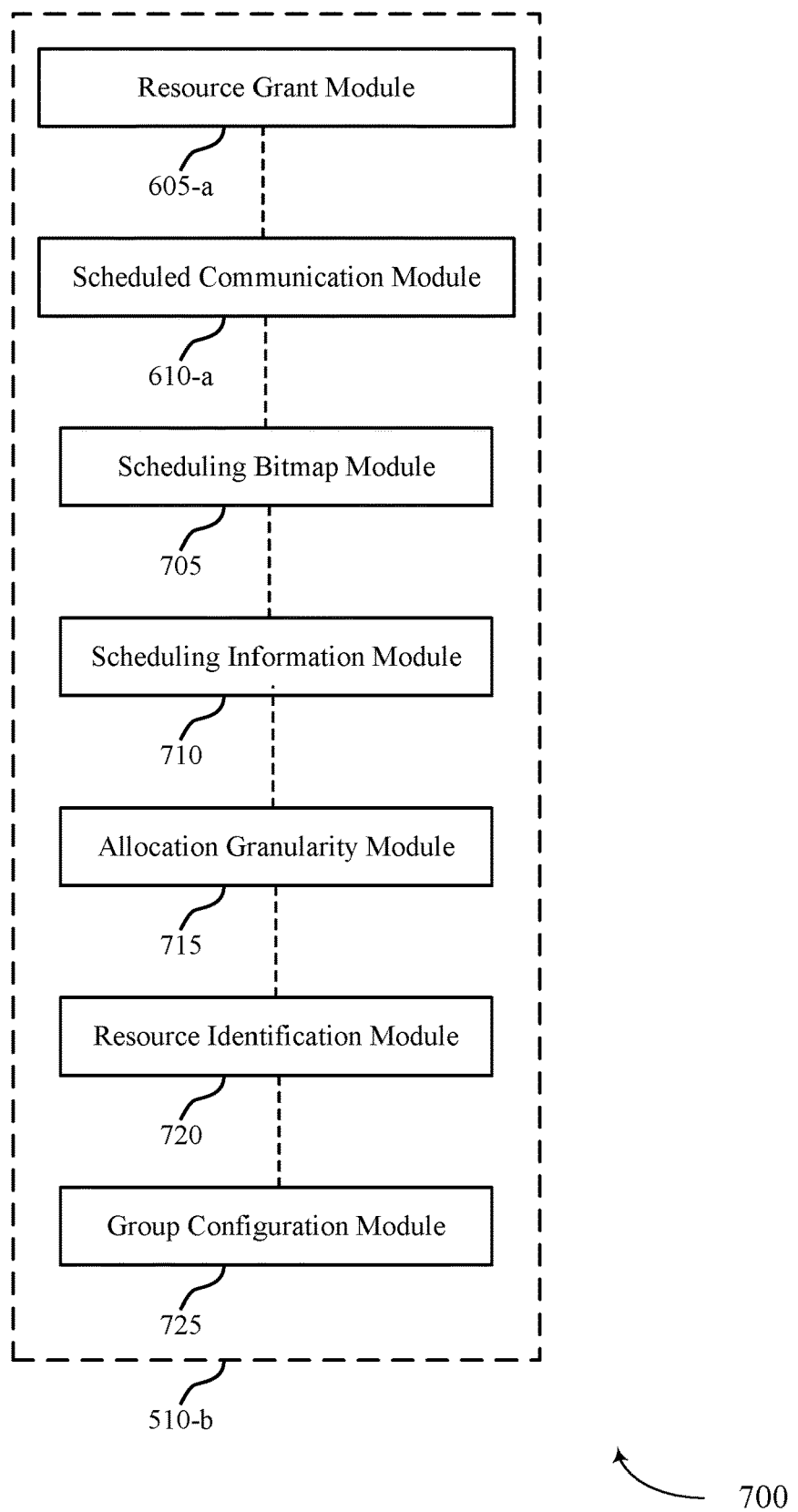
FIG. 7 shows a block diagram of an exemplary wireless device that supports joint control for eCA in accordance with various aspects of the present disclosure.

FIG. 7 shows a block diagram 700 of a joint control module 510-b which may be a component of a wireless device 500 or a wireless device 600 for joint control in eCA configurations in accordance with various aspects of the present disclosure. The joint control module 510-b may be an example of aspects of a joint control module 510 described with reference to FIGS. 5-6. The joint control module 510-b may include a resource grant module 605-a, and a scheduled communication module 610-a. Each of these modules may perform the functions described above with reference to FIG. 6. The joint control module 510-b may also include a scheduling bitmap module 705, a scheduling information module 710, an allocation granularity module 715, a resource identification module 720, and a group configuration module 725.

The scheduling bitmap module 705 may configure a scheduling bitmap as part of a resource grant as described above with reference to FIGS. 2-4. In some examples, each bit of the scheduling bitmap corresponds to a CC group from the plurality of configured CCs. Alternatively, each bit of the scheduling bitmap corresponds to an individual CC from the plurality of configured CCs.

The scheduling information module 710 may configure scheduling information as part of a resource grant as described above with reference to FIGS. 2-4. Each set of scheduling information may, for example, include an MCS indication, a HARQ indication, an NDI, an RV indication, a TPC command, a precoding indication, or a DAI indication. In some examples, each set of scheduling information corresponds to an individual CC of the scheduled CCs. In some examples, each set of scheduling information corresponds to a group of CCs, and each of the corresponding groups includes one or several scheduled CC of the scheduled CCs. The one or more sets of scheduling information may include first scheduling information for at least one of the scheduled CCs and second scheduling information for at least two of the scheduled CCs.

The allocation granularity module 715 may determine the resource allocation granularity based on a number of resource allocation bits in the resource grant message or a number of the scheduled CCs as described above with reference to FIGS. 2-4. It may also determine the resource allocation granularity based on whether the resource grant message includes a message in a control region or a data region of a downlink CC The resource identification module 720 may identify a set of RBs on the scheduled CCs based on the resource grant message and the resource allocation granularity as described above with reference to FIGS. 2-4. The resource identification module 720 may also decode the control information in the controlling downlink shared channel. For example, the UE tunes to the RBs allocated to the control PDSCH obtained from the PDCCH, and decodes the control information from the control PDSCH. In some examples, time critical control messages of the control messages are decoded by the resource identification module 720 in a first segment of the assigned controlling downlink shared channel and delay tolerant control messages of the control messages are decoded by the resource identification module 720 in a next segment of the assigned controlling downlink shared channel. In some cases, the resource identification module 720 may validate the decoded control information using an error detection code.

Additionally or alternatively, the resource identification module 720 may configure the one or more configured CCs using the decoded control information. For example, using the information contained in the assignment indication from the PDCCH, the resource identification module 720 decodes the control PDSCH to retrieve the control information for decoding and scheduling the one or more configured CCs that control information was included in the control PDSCH. The control PDSCH may include such control information for one, many, or all of the CCs configured for the UE.

The resource identification module 720 may also receive, in the downlink control channel, a rank and MCS for the assigned controlling downlink shared channel, wherein the rank and MCS are used in the decoding the control information. In some examples, the resource identification module 720 may attempt to decode the control information from the controlling downlink shared channel at a plurality of times prior to receiving a complete transmission of the controlling downlink shared channel and process any portion of the control information decoded prior to the complete transmission immediately upon decoding.

The group configuration module 725 may receive a group configuration message partitioning one or more of the plurality of configured CCs into one or more groups of CCs, where the one or more groups of CCs include at least two configured CCs as described above with reference to FIGS. 2-4. In some examples, the indication includes an index of a group from the one or more groups of CCs. The configured CCs may be partitioned into one or more groups based on whether the scheduled CCs include uplink CCs or downlink CCs. In some cases, a group may include downlink CCs, where each downlink CC of the at least one group of CCs is associated with a same uplink control channel. In some cases, a resource allocation of the resource grant message may be based on a composite bandwidth of the group. The group configuration module 725 may also receive a plurality of resource grant messages, where each resource grant message corresponds to the one or more groups of CCs.

Figure 8:
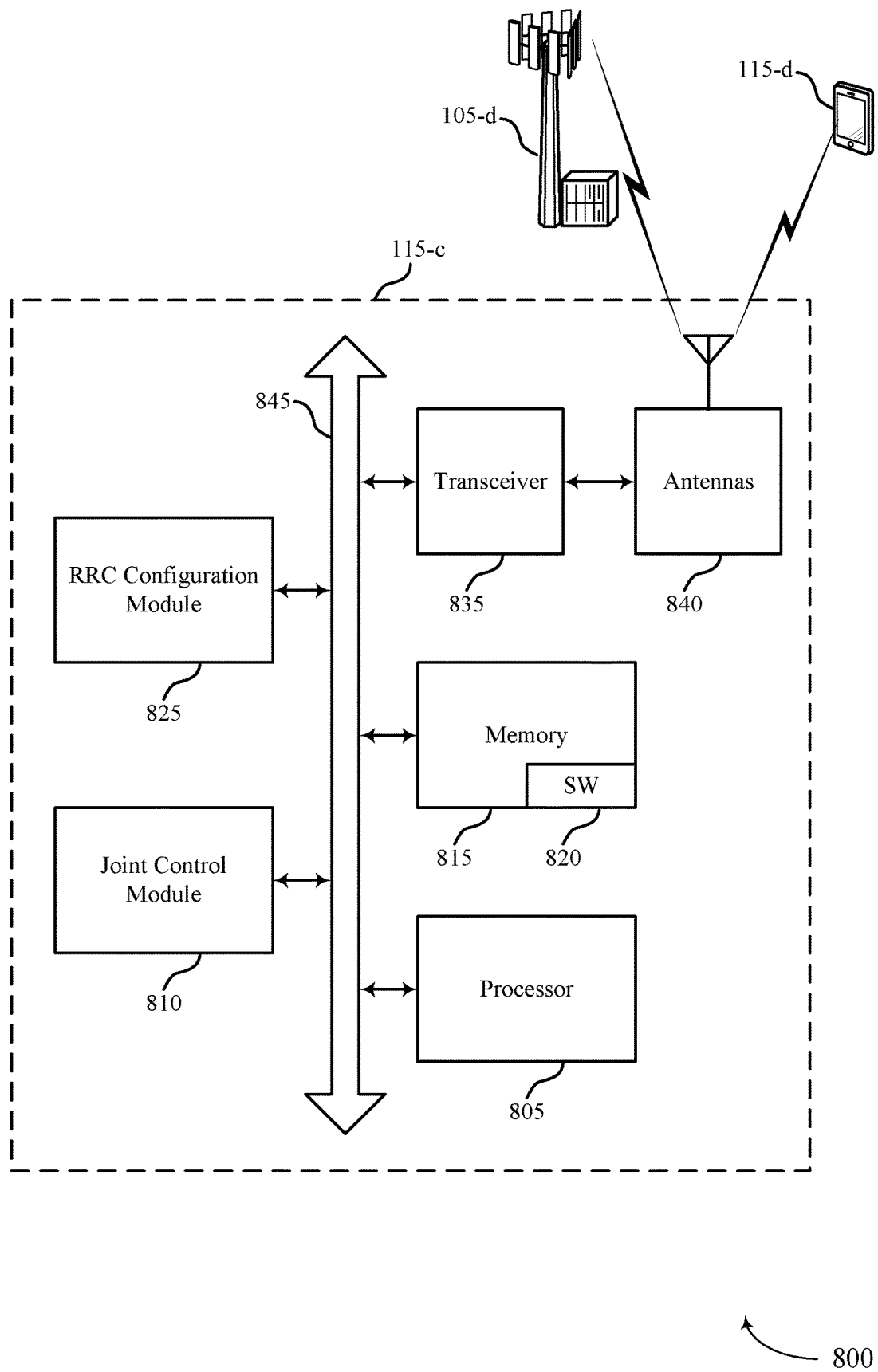
FIG. 8 illustrates an example of a system including a user equipment (UE) that supports joint control for eCA in accordance with various aspects of the present disclosure.

FIG. 8 shows a diagram of an exemplary system 800, including a UE, that supports joint control in eCA configurations in accordance with various aspects of the present disclosure. System 800 may include UE 115-c, which may be an example of a wireless device 500, a wireless device 600, or a UE 115 described above with reference to FIGS. 1, 2 and 5-7. UE 115-c may include a joint control module 810, which may be an example of a joint control module 510 described with reference to FIGS. 5-7. UE 115-c may also include a RRC configuration module 825. UE 115-c may also include components for bi-directional voice and data communications including components for transmitting communications and components for receiving communications. For example, UE 115-c may communicate bi-directionally with base station 105-d or UE 115-d.

The RRC configuration module 825 may receive an RRC configuration message establishing a configuration for the plurality of configured CCs as described above with reference to FIGS. 2-4.

UE 115-c may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-c may include a single antenna 840, UE 115-c may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805, and thus UE 115-c, to perform various functions described herein (e.g., joint control for eCA, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.)

Figure 9:
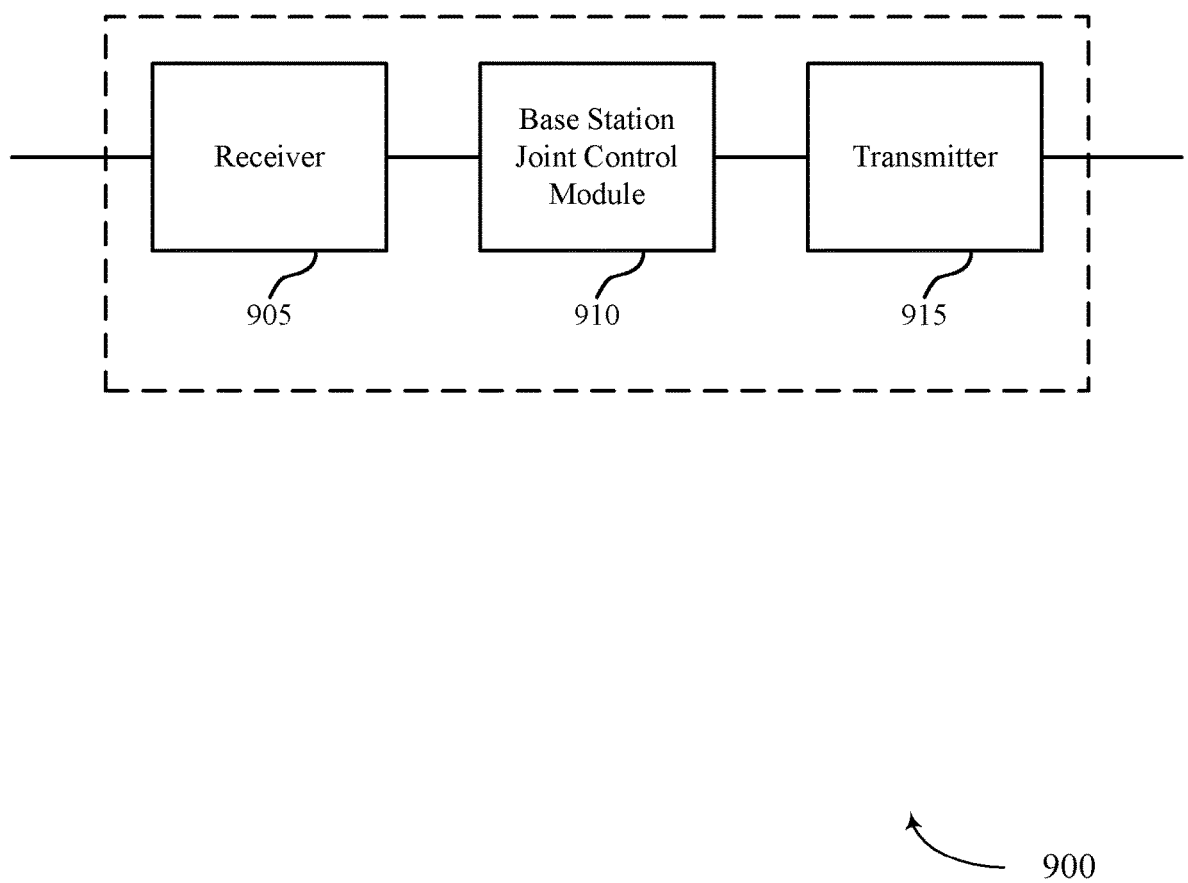
FIG. 9 shows a block diagram of an exemplary wireless device that supports joint control for eCA in accordance with various aspects of the present disclosure.

FIG. 9 shows a block diagram of an exemplary wireless device 900 that supports joint control in eCA configurations in accordance with various aspects of the present disclosure.

Wireless device 900 may be an example of aspects of a base station 105 described with reference to FIGS. 1-8. Wireless device 900 may include a receiver 905, a base station joint control module 910, or a transmitter 915. Wireless device 900 may also include a processor. Each of these components may be in communication with each other.

The receiver 905 may receive information such as packets, user data, or control information associated with various information channels (e.g., control channels, data channels, and information related to joint control for eCA, etc.). Information may be passed on to the base station joint control module 910, and to other components of wireless device 900.

The base station joint control module 910 may transmit a resource grant message for a plurality of configured CCs that includes an indication of scheduled CCs from the plurality of configured CCs for a subframe. The scheduled CCs may be uplink or downlink CCs. This transmission may be performed in combination with the transmitter 915. A resource allocation granularity associated with the resource grant message may be based on a number of the scheduled CCs. The base station joint control module 910 may communicate on the scheduled CCs during the subframe in accordance with the resource grant message. This communication may be performed in combination with the receiver 905 or the transmitter 915, in various examples.

The transmitter 915 may transmit signals received from other components of wireless device 900. In some examples, the transmitter 915 may be collocated with the receiver 905 in a transceiver module. The transmitter 915 may include a single antenna, or it may include a plurality of antennas. In some examples, communicating on the scheduled CCs comprises transmitting one or more data blocks to a UE 115 on a scheduled set of RBs.

Figure 10:
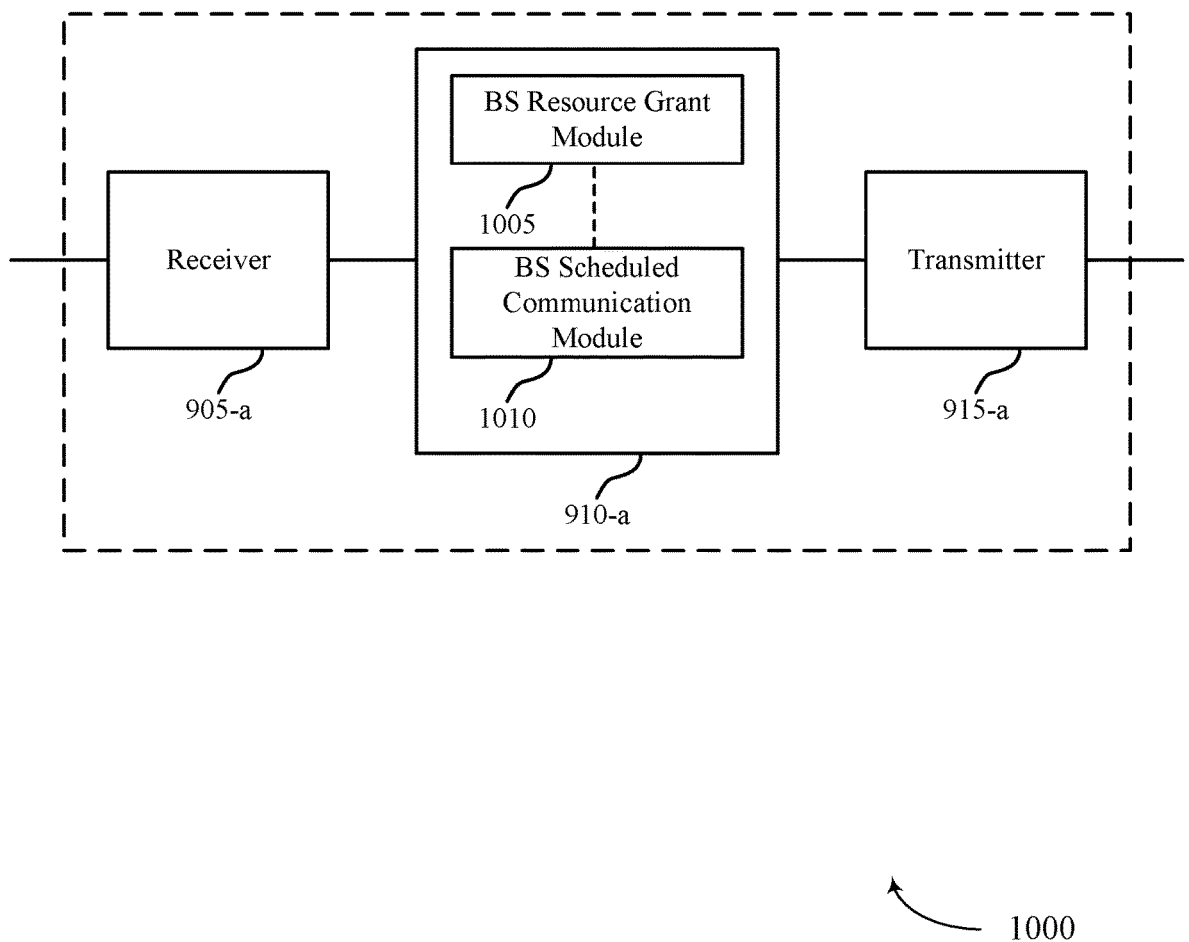
FIG. 10 shows a block diagram of an exemplary wireless device that supports joint control for eCA in accordance with various aspects of the present disclosure.

FIG. 10 shows a block diagram of an exemplary wireless device 1000 that supports joint control in eCA configurations in accordance with various aspects of the present disclosure. Wireless device 1000 may be an example of aspects of a wireless device 900 or a base station 105 described with reference to FIGS. 1-9. Wireless device 1000 may include a receiver 905-a, a base station joint control module 910-a, or a transmitter 915-a. Wireless device 1000 may also include a processor. Each of these components may be in communication with each other. The base station joint control module 910-a may also include a BS resource grant module 1005, and a BS scheduled communication module 1010.

The receiver 905-a may receive information which may be passed on to base station joint control module 910-a, and to other components of wireless device 1000. The base station joint control module 910-a may perform the operations described above with reference to FIG. 9. The transmitter 915-a may transmit signals received from other components of wireless device 1000.

The BS resource grant module 1005 may transmit a resource grant message for a plurality of configured CCs comprising an indication of scheduled CCs from the plurality of configured CCs for a subframe, and a resource allocation granularity associated with the resource grant message may be based on a number of the scheduled CCs as described above with reference to FIGS. 2-4. The resource grant message may be transmitted in a data or control region of a message, and the grant message may be transmitted on a downlink control channel or a downlink shared channel.

The BS resource grant module 1005 may also generate an assignment indication assigning a controlling downlink shared channel to a UE. For examples, BS resource grant module 1005 may assign a control PDSCH to a particular UE 115 being served using eCA communications. In some cases, the assignment indication may include one or more parameters for the assigned controlling downlink shared channel, where the one or more parameters may include one or more resource blocks allocated to the assigned controlling downlink shared channel, a transmission format, or a control flag. In some cases, the control flag may indicate that the assigned controlling downlink control channel is configured for managing the plurality of CCs.

The BS resource grant module 1005 may also transmit a downlink control channel including the assignment indication on one CC of a plurality of CCs configured for the UE 115. In some cases, it may include the assignment indication in a downlink control channel. The BS resource grant module 1005 may also transmit the assigned controlling downlink shared channel to the UE, for example, by using transmitter 915-*a*. In some examples, the downlink assignments may point to the future subframe, and the method may further include, in response to failing to receive an acknowledgement from the UE for the controlling downlink shared channel, one of retransmitting the control information in a HARQ retransmission of the controlling downlink shared channel, or canceling the downlink assignments associated with the controlling downlink shared channel.

The BS scheduled communication module 1010 may communicate on the scheduled CCs during the subframe in accordance with the resource grant message as described above with reference to FIGS. 2-4. In the case of uplink, BS scheduled communication module 1010 may receive transmissions from a UE 115, for example, a common HARQ feedback message for the scheduled CCs.

Figure 11:
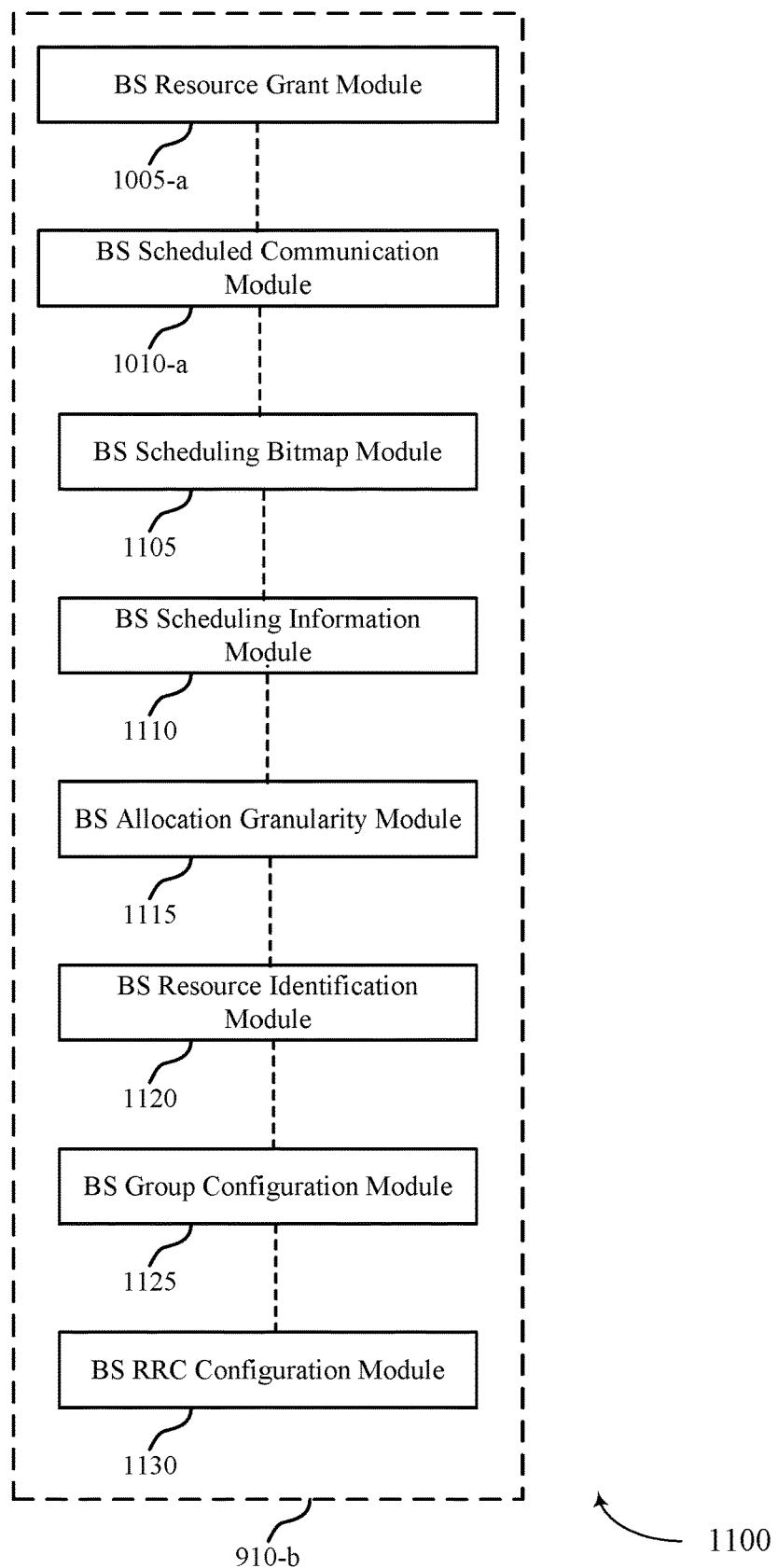
FIG. 11 shows a block diagram of an exemplary wireless device that supports joint control for eCA in accordance with various aspects of the present disclosure.

FIG. 11 shows a block diagram 1100 of a base station joint control module 910-*b* which may be a component of a wireless device 900 or a wireless device 1000 for joint control in eCA configurations in accordance with various aspects of the present disclosure. The base station joint control module 910-*b* may be an example of aspects of a base station joint control module 910 described with reference to FIGS. 9-10. The base station joint control module 910-*b* may include a BS resource grant module 1005-*a*, and a BS scheduled communication module 1010-*a*. Each of these modules may perform the functions described above with reference to FIG. 10. The base station joint control module 910-*b* may also include a BS scheduling bitmap module 1105, a BS scheduling information module 1110, a BS allocation granularity module 1115, a BS resource identification module 1120, a BS group configuration module 1125, and a BS RRC configuration module 1130.

The BS scheduling bitmap module 1105 may configure the scheduling indication of a resource grant message to include a scheduling bitmap as described above with reference to FIGS. 2-4.

The BS scheduling information module 1110 may configure the resource grant message to include one or more sets of scheduling information as described above with reference to FIGS. 2-4. In some examples, the BS scheduling information module 1110 may schedule one or more CCs of the plurality of CCs in the assigned controlling downlink shared channel. It may generate the control PDSCH by including the aggregated control messages and all of the control information used to support the large number of CCs with eCA operation. PDSCH may accommodate such amounts of information as, unlike PDCCH, the payload size and resources of PDSCH, including the control PDSCH, are assigned and flexible, depending on the amount of information carried. In some examples, the BS scheduling information module 1110 may schedule the one or more CCs with control messages that include downlink assignments for one or more CCs, uplink assignments for one or more CCs, HARQ control information for uplink of the UE, or one or more CFI corresponding to the one or more CCs. The one or more sets of scheduling information may, in some example, include first scheduling information for at least one of the scheduled CCs and second scheduling information for at least two of the scheduled CCs.

In some cases, the BS scheduling information module 1110 may arrange time critical control messages of the control messages such that they are placed in a first segment of the assigned controlling downlink shared channel and delay tolerant control messages of the control messages are placed in a next segment of the assigned controlling downlink shared channel. In some cases, the downlink assignments for the one or more CCs may point to a downlink shared channel in one of a same subframe as the assigned controlling downlink shared channel or a future subframe, and one of a same CC or a different CC of the plurality of CCs.

The BS allocation granularity module 1115 may determine the resource allocation granularity based on a number of resource allocation bits in the resource grant message or a number of the scheduled CCs as described above with reference to FIGS. 2-4. The granularity may be based on whether the scheduled CCs comprise uplink CCs or downlink CCs. Additionally or alternatively, the resource allocation granularity associated with the resource grant message may be based on whether the resource grant message comprises a message in a control region or a data region of a downlink CC.

In some examples, BS resource identification module 1120 may identify a set of RBs on the scheduled CCs based on the resource allocation granularity as described above with reference to FIGS. 2-4. BS resource identification module 1120 may also generate an error detection code for the assigned controlling downlink shared channel. In some examples, the BS resource identification module 1120 may selecting a MCS for the assigned controlling downlink shared channel, wherein the rank and MCS is selected to reduce a block error rate below a standard target block error rate for downlink shared channels, and transmitting the selected rank and MCS in the downlink control channel.

The BS group configuration module 1125 may transmit a group configuration message partitioning one or more of the plurality of configured CCs into one or more groups of CCs, where the one or more groups of CCs include at least two configured CCs as described above with reference to FIGS. 2-4. The BS group configuration module 1125 may partition the plurality of configured CCs into one or more groups of CCs based on whether the scheduled CCs comprise uplink CCs or downlink CCs. In some examples, at least one group of CCs comprises downlink CCs and each downlink CC of the at least one group of CCs is associated with a same uplink control channel. The BS RRC configuration module 1130 may transmit an RRC configuration message establishing a configuration for the plurality of configured CCs as described above with reference to FIGS. 2-4. BS RRC configuration module 1130 may also transmit a plurality of resource grant messages, where each resource grant message of the plurality corresponds to the one or more groups of CCs. In some cases, BS RRC configuration module 1130 may transmit a resource grant message for an additional single configured CC.

The components of wireless devices 500, 600, 900 and 1000; the joint control module 510-*b*; and the base station joint control module 910-*b* may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 12:
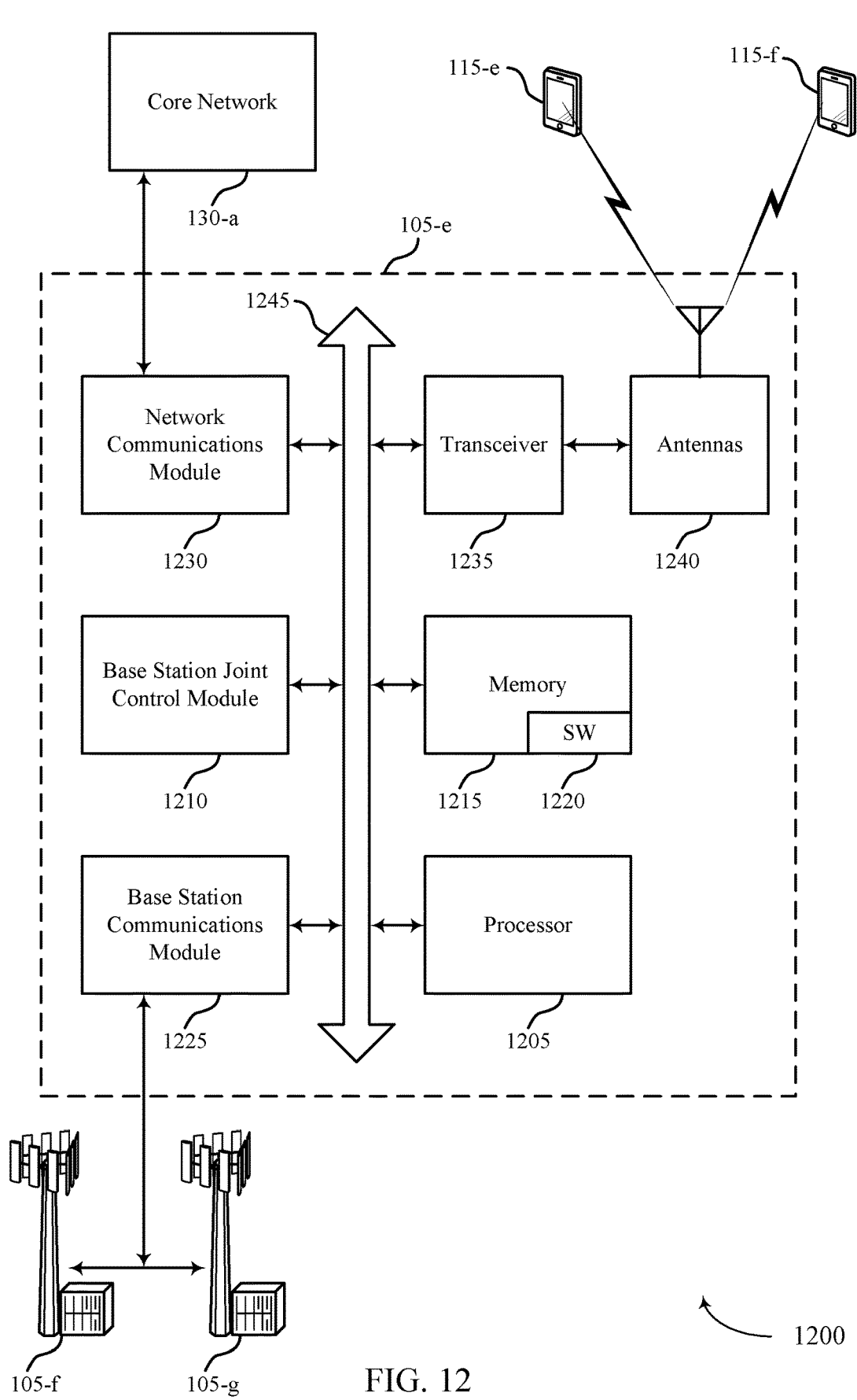
FIG. 12 illustrates an example of a system including a base station that supports joint control for eCA in accordance with various aspects of the present disclosure.

FIG. 12 shows a diagram of an exemplary system 1200, including a base station, that supports joint control in eCA configurations in accordance with various aspects of the present disclosure. System 1200 may include base station 105-*e*, which may be an example of a wireless device 900, a wireless device 1000, or a base station 105 described above with reference to FIGS. 1, 2 and 9-11. Base station 105-*e* may include a base station joint control module 910, which may be an example of a base station joint control module 910 described with reference to FIGS. 9-11. Base station 105-*e* may also include components for bi-directional voice and data communications including components for transmitting communications and components for receiving communications. For example, base station 105-*e* may communicate bi-directionally with base station 105-*f*, base station 105-*g*, UE 115-*e*, or UE 115-*f*.

In some cases, base station 105-*e* may have one or more wired backhaul links. Base station 105-*e* may have a wired backhaul link (e.g., S1 interface, etc.) to the core network 130. Base station 105-*e* may also communicate with other base stations 105, such as base station 105-*f* and base station 105-*g* via inter-base station backhaul links (e.g., an X2 interface). Each of the base stations 105 may communicate with UEs 115 using the same or different wireless communications technologies. In some cases, base station 105-*e* may communicate with other base stations such as 105-*e* or 105-*f* utilizing base station communications module 1225. In some examples, base station communications module 1225 may provide an X2 interface within an LTE/LTE-A wireless communication network technology to provide communication between some of the base stations 105. In some examples, base station 105-*e* may communicate with other base stations through core network 130. In some cases, base station 105-*e* may communicate with the core network 130 through network communications module 1230.

The base station 105-*e* may include a processor 1205, memory 1215 (including software (SW) 1220), transceiver 1235, and antenna(s) 1240, which each may be in communication, directly or indirectly, with one another (e.g., over bus system 1245). The transceivers 1235 may be configured to communicate bi-directionally, via the antenna(s) 1240, with the UEs 115, which may be multi-mode devices. The transceiver 1235 (or other components of the base station 105-*e*) may also be configured to communicate bi-directionally, via the antennas 1240, with one or more other base stations (not shown). The transceiver 1235 may include a modem configured to modulate the packets and provide the modulated packets to the antennas 1240 for transmission, and to demodulate packets received from the antennas 1240. The base station 105-*e* may include multiple transceivers 1235, each with one or more associated antennas 1240. The transceiver may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor 1210, and thus base station 105-*e*, to perform various functions described herein (e.g., joint control for eCA, selecting coverage enhancement techniques, call processing, database management, message routing, etc.). Alternatively, the software/firmware code 1220 may not be directly executable by the processor 1205 but be configured to cause a, e.g., when compiled and executed, to perform functions described herein. The processor 1205 may include an intelligent hardware device, e.g., a CPU, a microcontroller, an ASIC, etc. The processor 1205 may include various special purpose processors such as encoders, queue processing modules, base band processors, radio head controllers, digital signal processor (DSPs), and the like.

The base station communications module 1225 may manage communications with other base stations 105. The communications management module may include a controller or scheduler for controlling communications with UEs 115 in cooperation with other base stations 105. For example, the base station communications module 1225 may coordinate scheduling for transmissions to UEs 115 for various interference mitigation techniques such as beamforming or joint transmission.

Figure 13:
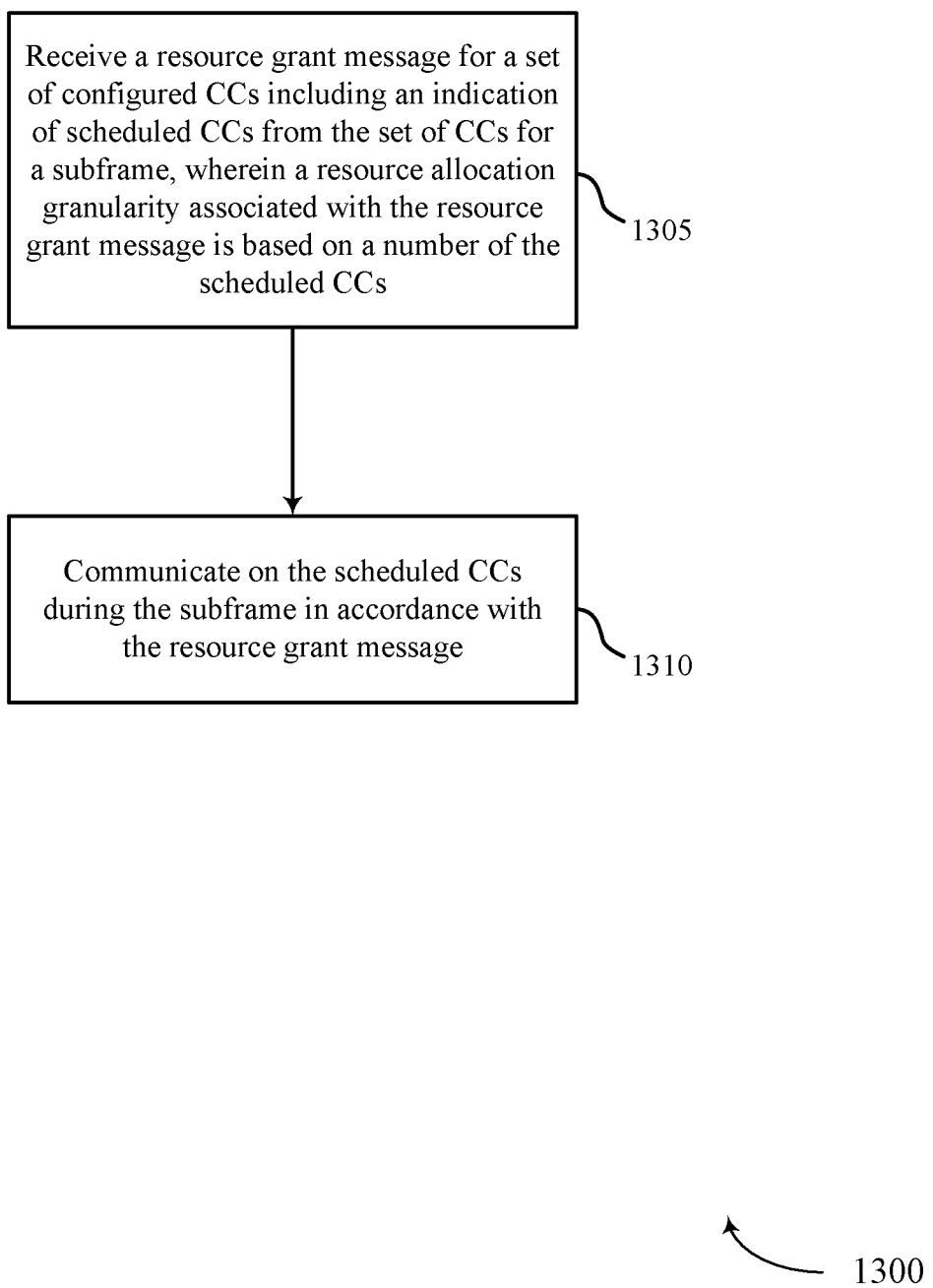
FIG. 13 illustrates a method for joint control in eCA configurations in accordance with various aspects of the present disclosure.

FIG. 13 shows a flowchart illustrating a method 1300 for joint control in eCA configurations in accordance with various aspects of the present disclosure. The operations of method 1300 may be implemented by a UE 115 or its components as described with reference to FIGS. 1-12. For example, the operations of method 1300 may be performed by the joint control module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may receive a resource grant message for a plurality of configured CCs that includes an indication of scheduled CCs from the plurality of configured CCs for a subframe, where a resource allocation granularity associated with the resource grant message may be based on a number of the scheduled CCs as described above with reference to FIGS. 2-4. In certain examples, the operations of block 1305 may be performed by the resource grant module 605 as described above with reference to FIG. 6. In some cases, the resource allocation granularity associated with the resource grant message may be based on whether the scheduled CCs comprise uplink CCs or downlink CCs.

At block 1310, the UE 115 may communicate on the scheduled CCs during the subframe in accordance with the resource grant message as described above with reference to FIGS. 2-4. In certain examples, the operations of block 1310 may be performed by the scheduled communication module 610 as described above with reference to FIG. 6.

In some examples of the method, the resource grant message is received in a control region of a downlink CC or in a data region of a downlink CC, and the resource allocation granularity associated with the resource grant message may be based on whether the resource grant message is received in the control region or the data region of the downlink CC. In other examples, the resource grant message may be received in a downlink control channel or a downlink shared channel. The resource grant message may include one or more sets of scheduling information, where each set of scheduling information includes at least one of a MCS indication, a HARQ indication, an new data indicator (NDI), a redundancy version (RV) indication, a transmit power control (TPC) command, a precoding indication, or a data assignment index (DAI) indication, or any combination thereof. In some cases, the one or more sets of scheduling information includes first scheduling information for at least one of the scheduled CCs and second scheduling information for at least two of the scheduled CCs. In some examples, the size of the resource grant message is based on a number of the plurality of configured CCs, or the grant message may be a semi-static downlink control information (DCI) length. In some examples, the UE 115 may receive a resource grant message for an additional single configured CC.

The method may also include determining the resource allocation granularity associated with the resource grant message based on a number of resource allocation bits in the resource grant message or the number of the scheduled CCs. Additionally or alternatively, the method may include receiving a group configuration message partitioning the plurality of configured CCs into one or more groups of CCs, where each of the one or more groups of CCs comprise at least two configured CCs, and receiving a plurality of resource grant messages, where each resource grant message of the plurality corresponds to a group of CCs in the one or more groups of CCs. The partitioning may be based whether the scheduled CCs include uplink CCs or downlink CCs. In some cases, at least one group of CCs comprises downlink CCs and each downlink CC of the at least one group of CCs is associated with a same uplink control channel. In some examples, the method includes transmitting a common HARQ feedback message for the scheduled CCs.

Figure 14:
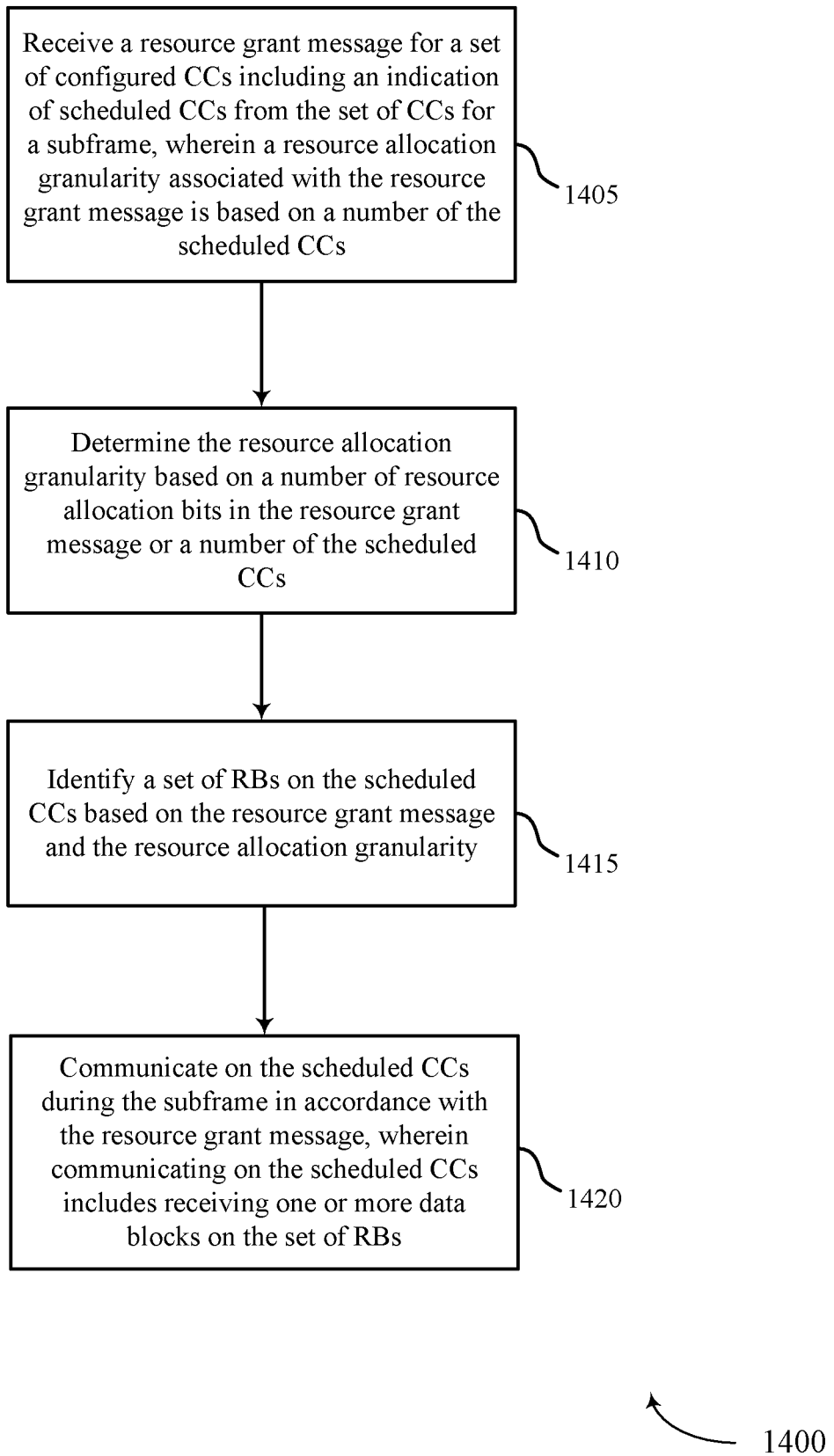
FIG. 14 illustrates a method for joint control in eCA configurations in accordance with various aspects of the present disclosure.

FIG. 14 shows a flowchart illustrating a method 1400 for joint control in eCA configurations in accordance with various aspects of the present disclosure. The operations of method 1400 may be implemented by a UE 115 or its components as described with reference to FIGS. 1-12. For example, the operations of method 1400 may be performed by the joint control module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may receive a resource grant message for a plurality of configured CCs that includes an indication of scheduled CCs from the plurality of configured CCs for a subframe, where a resource allocation granularity associated with the resource grant message may be based on the number of the scheduled CCs as described above with reference to FIGS. 2-4. In certain examples, the operations of block 1405 may be performed by the resource grant module 605 as described above with reference to FIG. 6.

At block 1410, the UE 115 may determine the resource allocation granularity based on a number of resource allocation bits in the resource grant message or a number of the scheduled CCs as described above with reference to FIGS. 2-4. In certain examples, the operations of block 1410 may be performed by the allocation granularity module 715 as described above with reference to FIG. 7.

At block 1415, the UE 115 may identify a set of RBs on the scheduled CCs based on the resource grant message and the resource allocation granularity as described above with reference to FIGS. 2-4. In certain examples, the operations of block 1415 may be performed by the resource identification module 720 as described above with reference to FIG. 7.

At block 1420, the UE 115 may communicate on the scheduled CCs during the subframe in accordance with the resource grant message as described above with reference to FIGS. 2-4. In some cases, communicating on the scheduled CCs includes receiving one or more data blocks on a set of RBs. In certain examples, the operations of block 1420 may be performed by the scheduled communication module 610 as described above with reference to FIG. 6.

Figure 15:
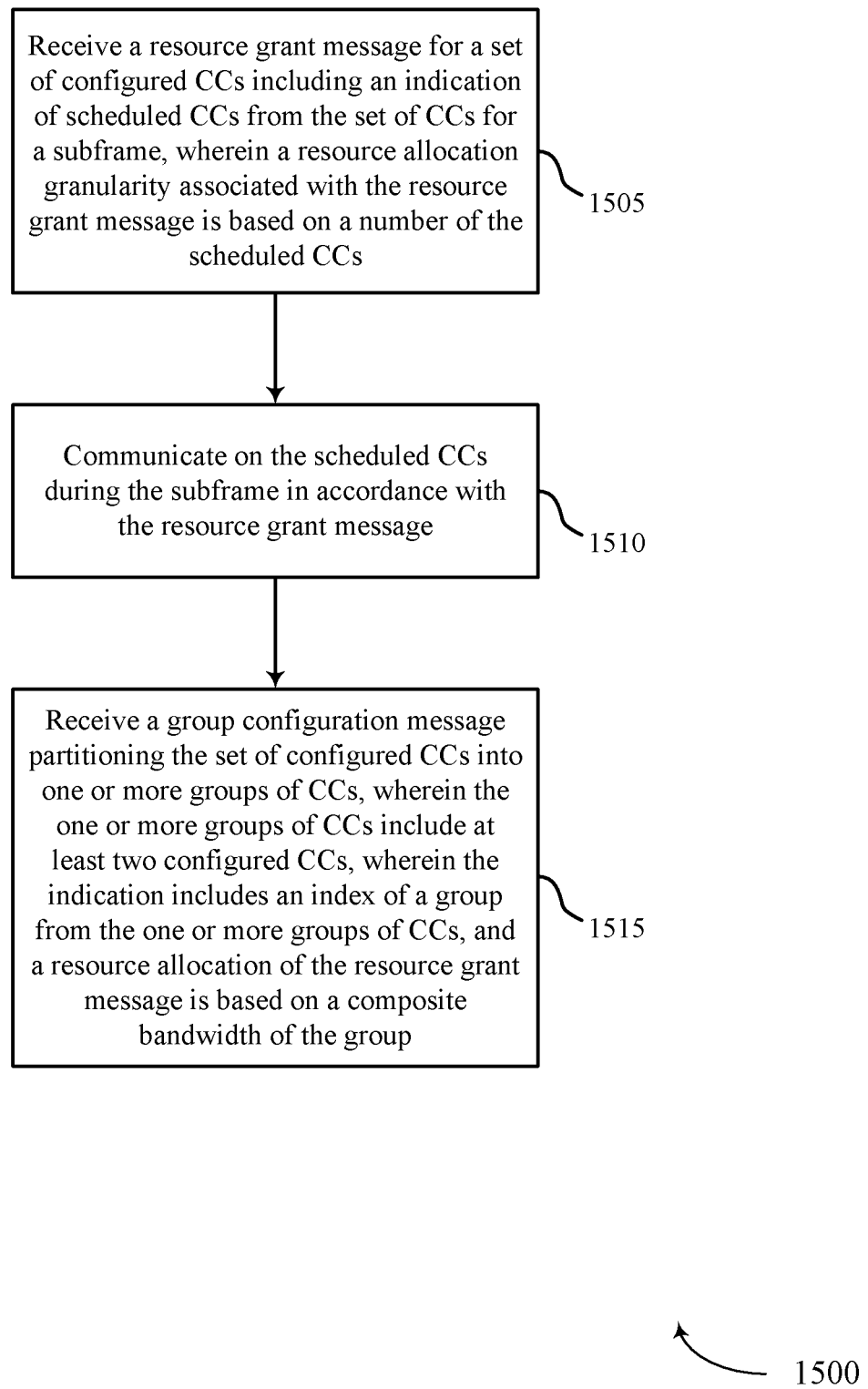
FIG. 15 illustrates a method for joint control in eCA configurations in accordance with various aspects of the present disclosure.

FIG. 15 shows a flowchart illustrating a method 1500 for joint control in eCA configurations in accordance with various aspects of the present disclosure. The operations of method 1500 may be implemented by a UE 115 or its components as described with reference to FIGS. 1-12. For example, the operations of method 1500 may be performed by the joint control module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300 or 1400 of FIGS. 13 and 14.

At block 1505, the UE 115 may receive a resource grant message for a plurality of configured CCs that includes an indication of scheduled CCs from the plurality of configured CCs in a subframe, where a resource allocation granularity associated with the resource grant message may be based on a number of the scheduled CCs as described above with reference to FIGS. 2-4. In certain examples, the operations of block 1505 may be performed by the resource grant module 605 as described above with reference to FIG. 6.

At block 1510, the UE 115 may communicate on the scheduled CCs during the subframe in accordance with the resource grant message as described above with reference to FIGS. 2-4. In certain examples, the operations of block 1510 may be performed by the scheduled communication module 610 as described above with reference to FIG. 6.

At block 1515, the UE 115 may receive a group configuration message partitioning the plurality of configured CCs into one or more groups of CCs, where each of the one or more groups of CCs include at least two configured CCs as described above with reference to FIGS. 2-4. In some cases, the indication includes an index of a group from the one or more groups of CCs. In some cases, a resource allocation of the resource grant message is based on a composite bandwidth of the group. In certain examples, the operations of block 1515 may be performed by the group configuration module 725 as described above with reference to FIG. 7.

Figure 16:
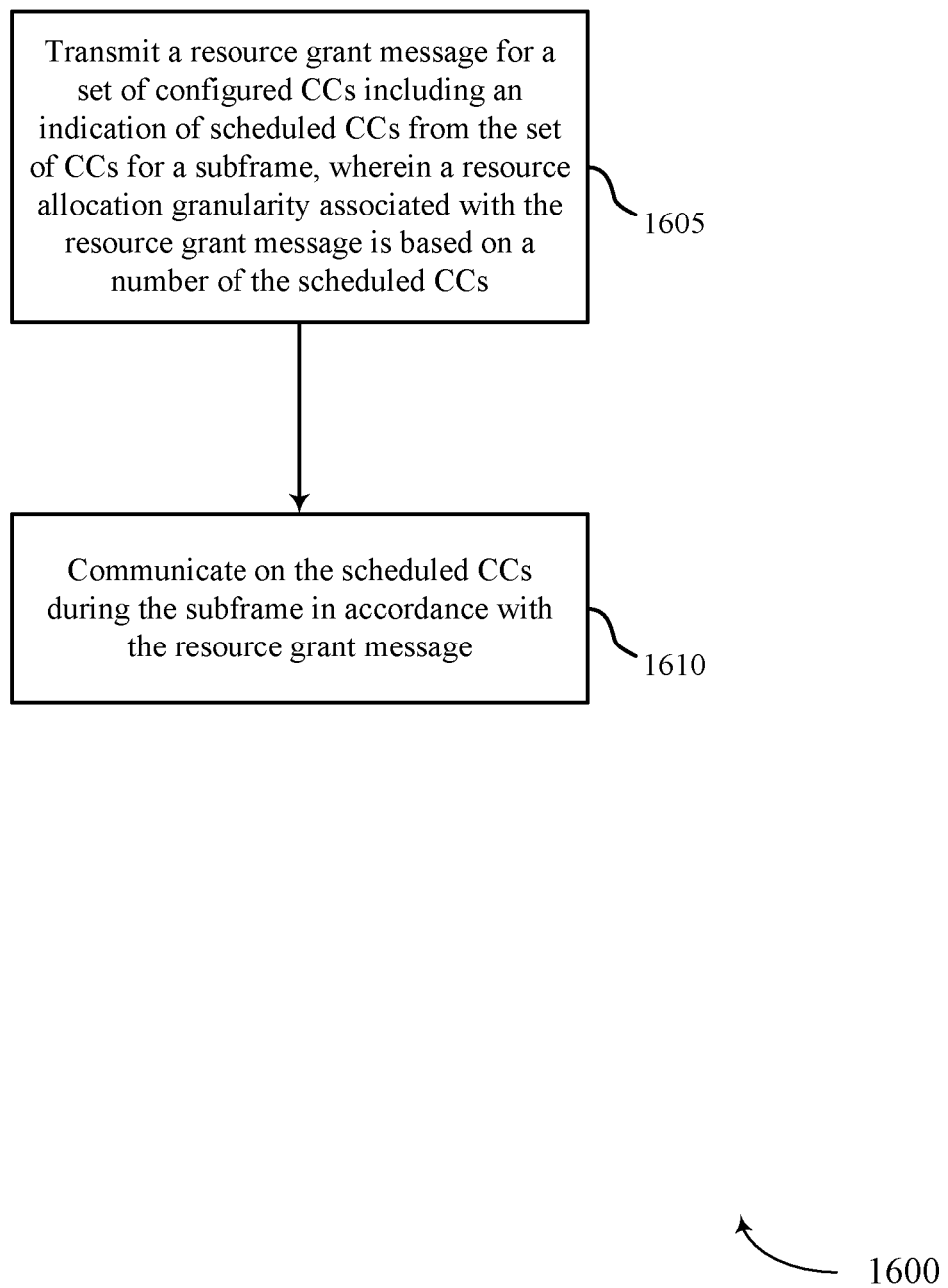
FIG. 16 illustrates a method for joint control in eCA configurations in accordance with various aspects of the present disclosure.

FIG. 16 shows a flowchart illustrating a method 1600 for joint control in eCA configurations in accordance with various aspects of the present disclosure. The operations of method 1600 may be implemented by a base station 105 or its components as described with reference to FIGS. 1-12. For example, the operations of method 1600 may be performed by the base station joint control module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware.

At block 1605, the base station 105 may transmit a resource grant message for a plurality of configured CCs including an indication of scheduled CCs from the plurality of configured CCs for a subframe, where a resource allocation granularity associated with the resource grant message is based on a number of the scheduled CCs as described above with reference to FIGS. 2-4. The granularity may also be based on whether the scheduled CCs comprise uplink CCs or downlink CCs. The resource grant message may be contained in a message in a control or data region of a downlink CC, and the granularity may depend on whether the resource grant message is in the control or data region. In some examples, the resource grant message may be transmitted in a downlink control channel or downlink shared channel. In other examples, the resource allocation granularity associated with the resource grant message may be based on a number of resource allocation bits in the resource grant message or the number of the scheduled CCs. In certain examples, the operations of block 1605 may be performed by the BS resource grant module 1005 as described above with reference to FIG. 10.

The resource grant message may include one or more sets of scheduling information, wherein each set of scheduling information comprises at least one of a modulation and coding scheme (MCS) indication, a hybrid automatic repeat request (HARQ) indication, an new data indicator (NDI), a redundancy version (RV) indication, a transmit power control (TPC) command, a precoding indication, or a data assignment index (DAI) indication, or any combination thereof. In some examples of the method, the one or more sets of scheduling information comprises first scheduling information for at least one of the scheduled CCs and second scheduling information for at least two of the scheduled CCs.

At block 1610, the base station 105 may communicate on the scheduled CCs during the subframe in accordance with the resource grant message as described above with reference to FIGS. 2-4. In certain examples, the operations of block 1610 may be performed by the scheduled communication module 610 as described above with reference to FIG. 6.

The method may also include transmitting a group configuration message that partitions the plurality of configured CCs into one or more groups of CCs, where the one or more groups of CCs comprise at least two configured CCs and transmitting a plurality of resource grant messages, where each resource grant message of the plurality corresponds to a group of CCs in the one or more groups of CCs. In some examples, the plurality of configured CCs may be partitioned into one or more groups of CCs based on whether the scheduled CCs comprise uplink CCs or downlink CCs. Additionally or alternatively, at least one group of CCs may include downlink CCs and each downlink CC of the at least one group of CCs is associated with a same uplink control channel. The method may also include transmitting a resource grant message for an additional single configured CC. In some examples, the method may include receiving a common HARQ feedback message for the scheduled CCs.

Figure 17:
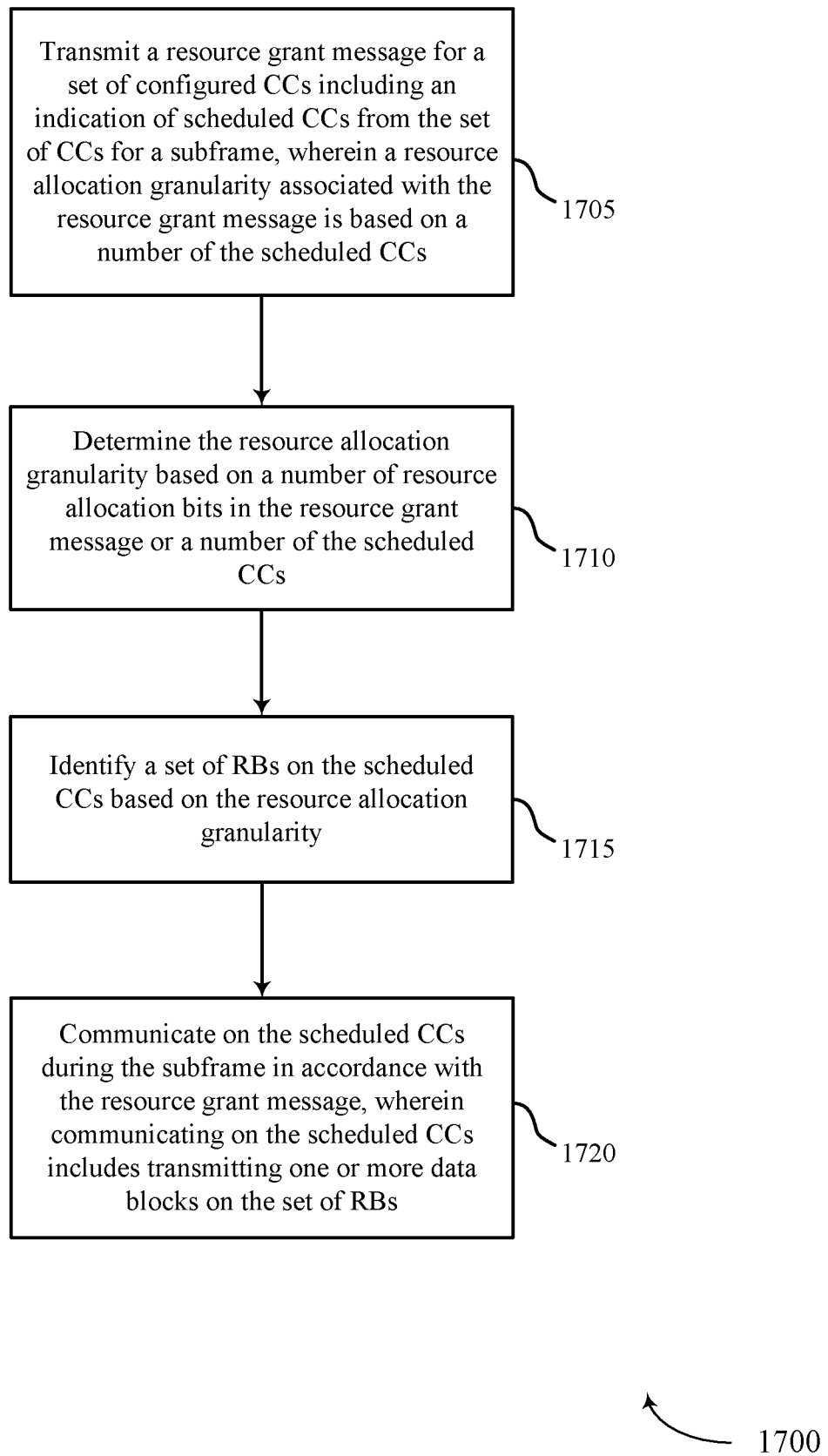
FIG. 17 illustrates a method for joint control in eCA configurations in accordance with various aspects of the present disclosure.

FIG. 17 shows a flowchart illustrating a method 1700 for joint control in eCA configurations in accordance with various aspects of the present disclosure. The operations of method 1700 may be implemented by a base station 105 or its components as described with reference to FIGS. 1-12. For example, the operations of method 1700 may be performed by the base station joint control module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of method 1600 of FIGS. 16.

At block 1705, the base station 105 may transmit a resource grant message for a plurality of configured CCs including an indication of scheduled CCs from the plurality of configured CCs for a subframe, where a resource allocation granularity associated with the resource grant message is based on a number of the scheduled CCs as described above with reference to FIGS. 2-4. In certain examples, the operations of block 1705 may be performed by the BS resource grant module 1005 as described above with reference to FIG. 10.

At block 1710, the base station 105 may determine the resource allocation granularity based on a number of resource allocation bits in the resource grant message or a number of the scheduled CCs as described above with reference to FIGS. 2-4. In certain examples, the operations of block 1710 may be performed by the allocation granularity module 715 as described above with reference to FIG. 7.

At block 1715, the base station 105 may identify a set of RBs on the scheduled CCs based on the resource allocation granularity as described above with reference to FIGS. 2-4. In certain examples, the operations of block 1715 may be performed by the BS resource identification module 1120 as described above with reference to FIG. 11.

At block 1720, the base station 105 may communicate on the scheduled CCs during the subframe in accordance with the resource grant message as described above with reference to FIGS. 2-4. In some cases, communicating on the scheduled CCs comprises transmitting one or more data blocks on the set of RBs. In certain examples, the operations of block 1720 may be performed by the scheduled communication module 610 as described above with reference to FIG. 6.

Figure 18:
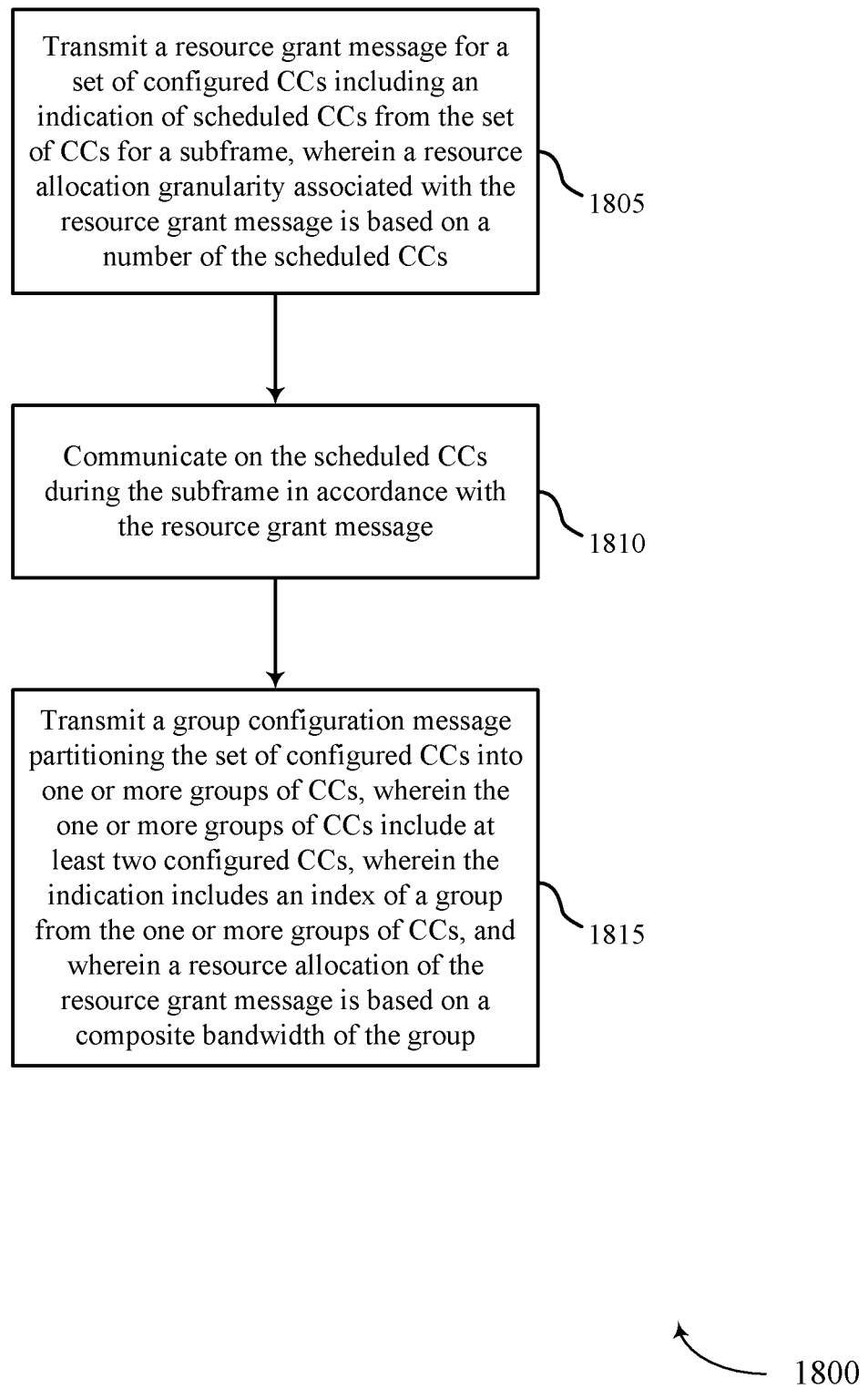
FIG. 18 illustrates a method for joint control in eCA configurations in accordance with various aspects of the present disclosure.

FIG. 18 shows a flowchart illustrating a method 1800 for joint control in eCA configurations in accordance with various aspects of the present disclosure. The operations of method 1800 may be implemented by a base station 105 or its components as described with reference to FIGS. 1-12. For example, the operations of method 1800 may be performed by the base station joint control module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1800 may also incorporate aspects of methods 1600 or 1700 of FIGS. 16 and 17.

At block 1805, the base station 105 may transmit a resource grant message for a plurality of configured CCs including an indication of scheduled CCs from the plurality of configured CCs for a subframe, where a resource allocation granularity associated with the resource grant message is based on a number of the scheduled CCs as described above with reference to FIGS. 2-4. In certain examples, the operations of block 1805 may be performed by the BS resource grant module 1005 as described above with reference to FIG. 10.

At block 1810, the base station 105 may communicate on the scheduled CCs during the subframe in accordance with the resource grant message as described above with reference to FIGS. 2-4. In certain examples, the operations of block 1810 may be performed by the scheduled communication module 610 as described above with reference to FIG. 6.

At block 1815, the base station 105 may transmit a group configuration message partitioning the plurality of configured CCs into one or more groups of CCs, where each of the one or more groups of CCs comprise at least two configured CCs as described above with reference to FIGS. 2-4. In some cases, the indication comprises an index of a group from the one or more groups of CCs. In some cases, a resource allocation of the resource grant message is based on a composite bandwidth of the group. In certain examples, the operations of block 1815 may be performed by the BS group configuration module 1125 as described above with reference to FIG. 11.

Figure 19:
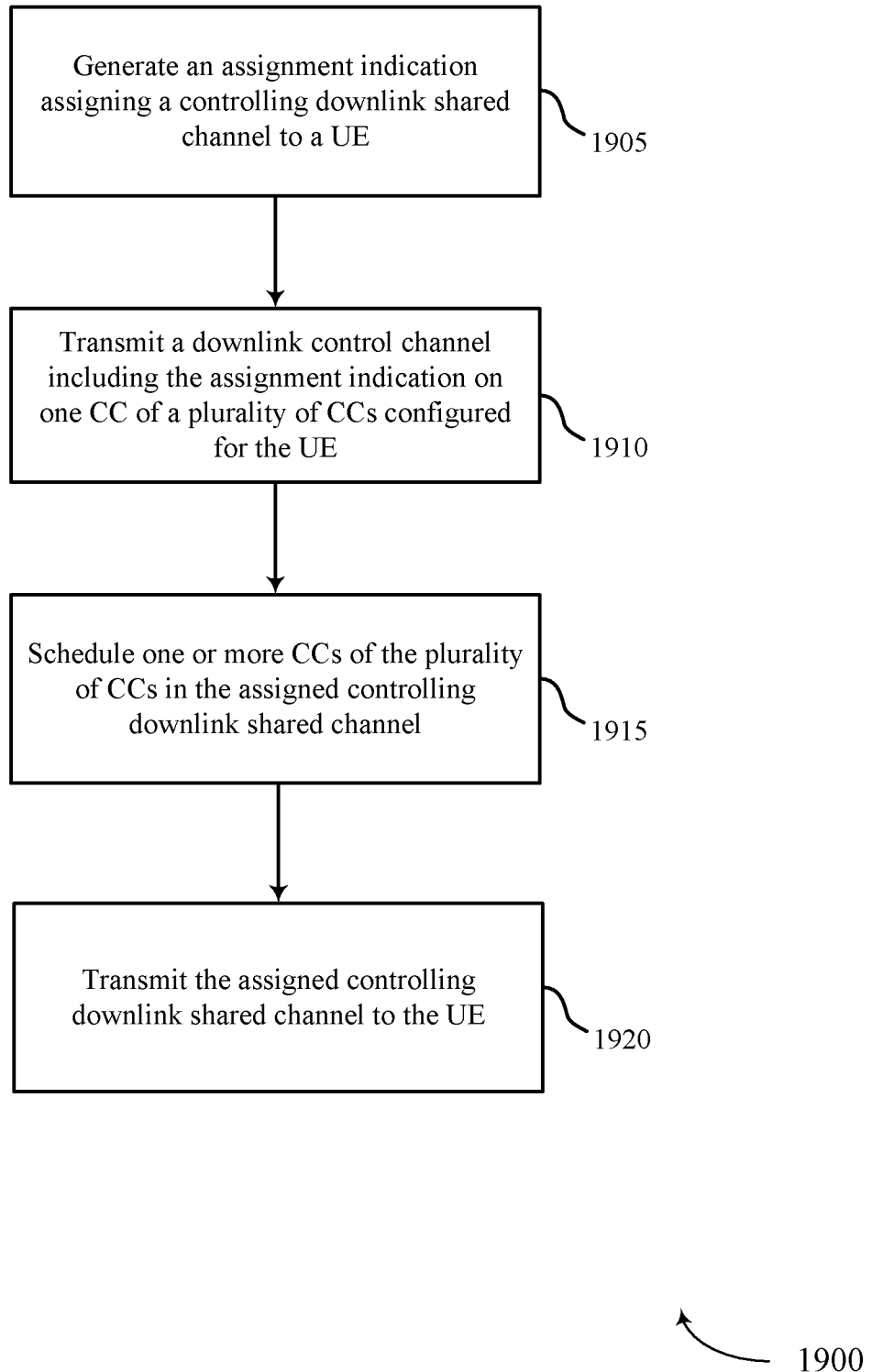
FIG. 19 illustrates a method for joint control in eCA configurations in accordance with various aspects of the present disclosure.

FIG. 19 shows a flowchart illustrating a method 1900 for two-stage resource assignment for eCA configurations in accordance with various aspects of the present disclosure. The operations of method 1900 may be implemented by a base station 105 or its components as described with reference to FIGS. 1-12. For example, the operations of method 1900 may be performed by the base station joint control module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1900 may also incorporate aspects of methods 1600, 1700, or 1800 of FIGS. 16-18.

At block 1905, the base station 105 may generate an assignment indication assigning a controlling downlink shared channel to a UE. In certain examples, the operations of block 1905 may be performed by the base station resource grant module 1005 as described above with reference to FIG. 10. In some examples, the base station 105 may assign a control PDSCH to a particular UE 115 being served using eCA communications. In some cases, the assignment indication may include one or more parameters for the assigned controlling downlink shared channel, where the one or more parameters may include one or more resource blocks allocated to the assigned controlling downlink shared channel, a transmission format, or a control flag. In some cases, the control flag may indicate that the assigned controlling downlink control channel is configured for managing the plurality of CCs.

At block 1910, the base station 105 may transmit a downlink control channel including the assignment indication on one CC of a plurality of CCs configured for the UE 115. In certain examples, the operations of block 1910 may be performed by the base station resource grant module 1005 as described above with reference to FIG. 10. In some cases, a base station 105 may include the assignment indication in a downlink control channel transmitted to the UE 115.

At block 1915, the base station 105 may schedule one or more CCs of the plurality of CCs in the assigned controlling downlink shared channel. In certain examples, the operations of block 1915 may be performed by the base station scheduling information module 1110 as described above with reference to FIG. 11. In some examples of the method, the base station 105 may generate the control PDSCH by including the aggregated control messages and all of the control information used to support the large number of CCs with eCA operation. PDSCH may accommodate such amounts of information as, unlike PDCCH, the payload size and resources of PDSCH, including the control PDSCH, are assigned and flexible, depending on the amount of information carried. In some examples of the method, the scheduling may include scheduling the one or more CCs with control messages that include downlink assignments for one or more CCs, uplink assignments for one or more CCs, HARQ control information for uplink of the UE, or one or more CFI corresponding to the one or more CCs.

In some examples of the method, time critical control messages of the control messages are placed in a first segment of the assigned controlling downlink shared channel and delay tolerant control messages of the control messages are placed in a next segment of the assigned controlling downlink shared channel. In some cases, the downlink assignments for the one or more CCs may point to a downlink shared channel in one of a same subframe as the assigned controlling downlink shared channel or a future subframe, and one of a same CC or a different CC of the plurality of CCs.

At block 1920, the base station 105 may transmit the assigned controlling downlink shared channel to the UE. In certain examples, the operations of block 1920 may be performed by the base station resource grant module 1005 as described above with reference to FIG. 10.

In some examples, the downlink assignments may point to the future subframe, and the method may further include, in response to failing to receive an acknowledgement from the UE for the controlling downlink shared channel, one of retransmitting the control information in a HARQ retransmission of the controlling downlink shared channel, or canceling the downlink assignments associated with the controlling downlink shared channel. The method may also include generating error detection code for the assigned controlling downlink shared channel. In some examples, the method may include selecting a rank and modulation coding scheme (MCS) for the assigned controlling downlink shared channel, wherein the rank and MCS is selected to reduce a block error rate below a standard target block error rate for downlink shared channels, and transmitting the selected rank and MCS in the downlink control channel.

Figure 20:
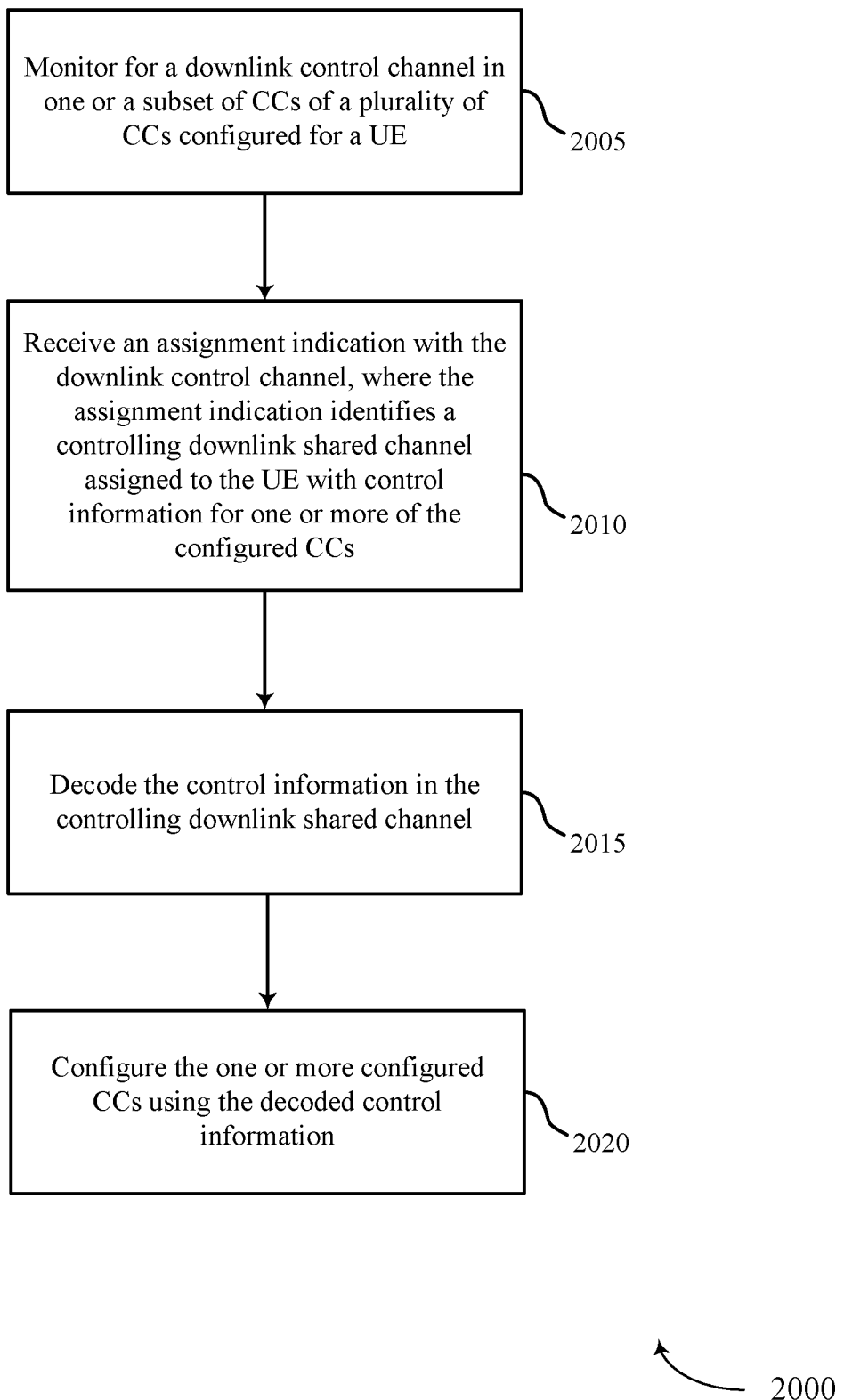
FIG. 20 illustrates a method for joint control in eCA configurations in accordance with various aspects of the present disclosure.

FIG. 20 shows a flowchart illustrating a method 2000 for two-stage resource assignment for eCA configurations in accordance with various aspects of the present disclosure. The operations of method 2000 may be implemented by a UE 115 or its components as described with reference to FIGS. 1-12. For example, the operations of method 2000 may be performed by the joint control module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 2000 may also incorporate aspects of methods 1300, 1400, or 1500 of FIGS. 13-15.

At block 2005, the UE 115 may monitor for a downlink control channel in one or a subset of CCs of a plurality of CCs configured for the UE. Thus, the UE 115 may be configured to monitor just one CC, such as an anchor CC or another CC designed for the UE 115, or may monitor a subset of the total number of CCs. By monitoring fewer than the total number configured for the UE 115, power may be conserved at the UE 115. In certain examples, the operations of block 2005 may be performed by the resource grant module 605 as described above with reference to FIG. 6.

At block 2010, the UE 115 may receive an assignment indication with the downlink control channel, where the assignment indication identifies a controlling downlink shared channel assigned to the UE 115 with control information for one or more of the configured CCs. For example, the PDCCH may include an indicator to identify to the UE 115 that the PDSCH that it is pointing to is a control PDSCH. Thus, the UE 115 may know to process the control PDSCH differently. Otherwise, the functionality of the PDCCH is similar to a regular PDCCH. The assignment indication for the control PDSCH received in the PDCCH may identify the resource blocks (RBs) allocated to the control PDSCH, whether located in the same CC or a different CC as the PDCCH, and also identify the parameters for the control PDSCH transmission, such as the MCS, rank, precoding matrix, HARQ parameters etc. The assignment indication may also include a control flag indicating that the assigned controlling downlink shared channel is configured for managing the plurality of CCs. In some examples, the downlink assignments for the one or more CCs may point to a downlink shared channel in one of a same subframe as the assigned controlling downlink shared channel or a future subframe. In certain examples, the operations of block 2010 may be performed by the resource grant module 605 as described above with reference to FIG. 6.

At block 2015, the UE 115 may decode the control information in the controlling downlink shared channel. For example, the UE tunes to the RBs allocated to the control PDCCH obtained from the PDCCH, and decodes the control information from the control PDSCH. In some examples, time critical control messages of the control messages are decoded by the UE 115 in a first segment of the assigned controlling downlink shared channel and delay tolerant control messages of the control messages are decoded by the UE 115 in a next segment of the assigned controlling downlink shared channel. In some cases, the UE 115 may validate the decoded control information using an error detection code. In certain examples, the operations of block 2015 may be performed by the resource identification module 720 as described above with reference to FIG. 7.

At block 2020, the UE 115 may configure the one or more configured CCs using the decoded control information. For example, using the information contained in the assignment indication from the PDCCH, the UE decodes the control PDSCH to retrieve the control information for decoding and scheduling the one or more configured CCs that control information was included in the control PDSCH. The control PDSCH may include such control information for one, many, or all of the CCs configured for the UE. In certain examples, the operations of block 2020 may be performed by the resource identification module 720 as described above with reference to FIG. 7.

The method may also include deactivating a receive chain associated with the one or more of the plurality of CCs corresponding to a received downlink assignment identifying downlink transmissions in the future subframe and reactivating the receive chain prior to the future subframe. In some cases, the UE 115 may activate an activity timer in response to reactivating the receive chain and may deactivate the receive chain in response to expiration of the activity timer when no additional downlink assignments are received prior to the expiration.

The method may further include receiving, in the downlink control channel, a rank and modulation coding scheme (MCS) for the assigned controlling downlink shared channel, wherein the rank and MCS are used in the decoding the control information. In some examples, the UE 115 may attempt to decode the control information from the controlling downlink shared channel at a plurality of times prior to receiving a complete transmission of the controlling downlink shared channel and process any portion of the control information decoded prior to the complete transmission immediately upon decoding.

Thus, methods 1300, 1400, 1500, 1600, 1700, 1800, 1900, and 2000 may provide for joint control in eCA configurations. It should be noted that methods 1300, 1400, 1500, 1600, 1700, 1800, 1900, and 2000 describe possible implementation, and that the operations and the steps may be rearranged or otherwise modified such that other implementations are possible. In some examples, aspects from two or more of the methods 1300, 1400, 1500, 1600, 1700, 1800, 1900, and 2000 may be combined.

The detailed description set forth above in connection with the appended drawings describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication performed by a user equipment (UE) operable to communicate on a plurality of configured component carriers (CCs) in carrier aggregation, comprising:
   receiving a resource grant message for a plurality of configured CCs comprising an indication of scheduled CCs from the plurality of configured CCs for a subframe;
   determining whether the scheduled CCs comprise uplink CCs or downlink CCs;
   identifying within the resource grant message a field used to indicate an allocation of resource blocks, wherein a size of the field is variable based at least in part on whether the scheduled CCs comprise uplink CCs or downlink CCs and a number of the scheduled CCs; and
   communicating on the scheduled CCs during the subframe in accordance with the resource grant message.

2. The method of claim 1, further comprising:
   identifying the field used to indicate the allocation of resource blocks within the resource grant message based at least in part on whether the resource grant message comprises a message in a control region or a data region of a downlink CC.

3. The method of claim 1, wherein the resource grant message comprises one or more sets of scheduling information, wherein each set of scheduling information comprises at least one of a modulation and coding scheme (MCS) indication, a hybrid automatic repeat request (HARQ) indication, an new data indicator (NDI), a redundancy version (RV) indication, a transmit power control (TPC) command, a precoding indication, or a data assignment index (DAI) indication, or any combination thereof.

4. The method of claim 3, wherein the one or more sets of scheduling information comprises first scheduling information for at least one of the scheduled CCs and second scheduling information for at least two of the scheduled CCs.

5. The method of claim 1, further comprising:
   identifying the field used to indicate the allocation of resource blocks within the resource grant message based at least in part on a number of resource allocation bits in the resource grant message or the number of the scheduled CCs.

6. The method of claim 1, further comprising:
   receiving a group configuration message partitioning the plurality of configured CCs into one or more groups of CCs, wherein each of the one or more groups of CCs comprise at least two configured CCs; and
   receiving a plurality of resource grant messages, wherein each resource grant message of the plurality of resource grant messages corresponds to a group of CCs in the one or more groups of CCs.

7. The method of claim 6, wherein at least one group of CCs comprises downlink CCs and each downlink CC of the at least one group of CCs is associated with a same uplink control channel.

8. The method of claim 6, wherein the plurality of configured CCs is partitioned into the one or more groups of CCs based at least in part on whether the scheduled CCs comprise uplink CCs or downlink CCs.

9. The method of claim 1, wherein the resource grant message is received in a control region of a downlink CC.

10. The method of claim 1, wherein the resource grant message is received in a data region of a downlink CC.

11. The method of claim 1, wherein the resource grant message is received in a downlink control channel.

12. The method of claim 1, wherein the resource grant message is received in a downlink shared channel.

13. The method of claim 1, further comprising:
receiving an additional resource grant message for an additional single configured CC.

14. The method of claim 1, further comprising:
transmitting a common HARQ feedback message for the scheduled CCs.

15. The method of claim 1, wherein a size of the resource grant message is based at least in part on a number of the plurality of configured CCs.

16. The method of claim 15, wherein the size of the resource grant message comprises a semi-static downlink control information (DCI) length.

17. The method of claim 1, wherein the size of the field used to indicate the allocation of resource blocks within the resource grant message comprises a total quantity of bits allocated to the field, and the method further comprising:
identifying the total quantity of bits allocated to the field based at least in part on whether the scheduled CCs comprise uplink CCs or downlink CCs and the number of the scheduled CCs.

18. An apparatus for wireless communication comprising a user equipment (UE) operable to communicate on a plurality of configured component carriers (CCs) in carrier aggregation, the apparatus comprising:
a processor;
memory in electronic communication with the processor; and
instructions stored in the memory and operable, when executed by the processor, to cause the apparatus to:
receive a resource grant message for a plurality of configured CCs comprising an indication of scheduled CCs from the plurality of configured CCs for a subframe;
determine whether the scheduled CCs comprise uplink CCs or downlink CCs;
identify within the resource grant message a field used to indicate the allocation of resource blocks, wherein a size of the field is variable based at least in part on whether the scheduled CCs comprise uplink CCs or downlink CCs and a number of the scheduled CCs; and
communicate on the scheduled CCs during the subframe in accordance with the resource grant message.

19. The apparatus of claim 18, wherein the instructions are executable by the processor to cause the apparatus to:
identify the field used to indicate the allocation of resource blocks within the resource grant message based at least in part on whether the resource grant message comprises a message in a control region or a data region of a downlink CC.

20. The apparatus of claim 18, wherein the instructions are executable by the processor to cause the apparatus to:
identify the field used to indicate the allocation of resource blocks within the resource grant message based at least in part on a number of resource allocation bits in the resource grant message or the number of the scheduled CCs.

21. The apparatus of claim 18, wherein the instructions are executable by the processor to cause the apparatus to:
receive a group configuration message partitioning the plurality of configured CCs into one or more groups of CCs, wherein each of the one or more groups of CCs comprise at least two configured CCs; and
receive a plurality of resource grant messages, wherein each resource grant message of the plurality of resource grant messages corresponds to a group of CCs in the one or more groups of CCs.

22. The apparatus of claim 21, wherein at least one group of CCs comprises downlink CCs and each downlink CC of the at least one group of CCs is associated with a same uplink control channel.

23. The apparatus of claim 21, wherein the plurality of configured CCs is partitioned into the one or more groups of CCs based at least in part on whether the scheduled CCs comprise uplink CCs or downlink CCs.

24. The apparatus of claim 18, wherein the resource grant message is received in a downlink control channel.

25. The apparatus of claim 18, wherein the resource grant message is received in a downlink shared channel.

26. The apparatus of claim 18, wherein the instructions are executable by the processor to cause the apparatus to:
receive a resource grant message for an additional single configured CC.

27. The apparatus of claim 18, wherein the instructions are executable by the processor to cause the apparatus to:
transmit a common HARQ feedback message for the scheduled CCs.

28. The apparatus of claim 18, wherein the size of the field used to indicate the allocation of resource blocks within the resource grant message comprises a total quantity of bits allocated to the field, and wherein the instructions are executable by the processor to cause the apparatus to:
identify the total quantity of bits allocated to the field based at least in part on whether the scheduled CCs comprise uplink CCs or downlink CCs and the number of the scheduled CCs.

29. An apparatus for wireless communication performed by a user equipment (UE) operable to communicate on a plurality of configured component carriers (CCs) in carrier aggregation, comprising:
means for receiving a resource grant message for a plurality of configured CCs comprising an indication of scheduled CCs from the plurality of configured CCs for a subframe;
means for determining whether the scheduled CCs comprise uplink CCs or downlink CCs;
means for identifying within the resource grant message a field used to indicate the allocation of resource blocks, wherein a size of the field is variable based at least in part on whether the scheduled CCs comprise uplink CCs or downlink CCs and a number of the scheduled CCs; and
means for communicating on the scheduled CCs during the subframe in accordance with the resource grant message.

30. A non-transitory computer-readable medium storing code for wireless communication, the code comprising instructions executable to:
receive a resource grant message for a plurality of configured component carriers (CCs) comprising an indication of scheduled CCs from the plurality of configured CCs for a subframe;
determine whether the scheduled CCs comprise uplink CCs or downlink CCs;
identify within the resource grant message a field used to indicate the allocation of resource blocks, wherein a size of the field is variable based at least in part on whether the scheduled CCs comprise uplink CCs or downlink CCs and a number of the scheduled CCs; and communicate on the scheduled CCs during the subframe in accordance with the resource grant message.

* * * * *